United States Patent
Findeisen et al.

[15] 3,676,854
[45] July 11, 1972

[54] KEYBOARD TO TAPE DATA INPUT PREPARATION UNIT

[72] Inventors: Heinz H. Findeisen, Milford, Mass.; James D. Kallmeyer, Springfield, Ill.; David G. Sokol, Auburn; James H. Stein, Auburn, Ill.; Thomas R. Thomas, Springfield, Ill.; Jack R. Bowers, Petersburg, Ill.

[73] Assignee: Sangamo Electric Company, Springfield, Ill.

[22] Filed: May 1, 1970

[21] Appl. No.: 33,723

[52] U.S. Cl. ..................................................340/172.5
[51] Int. Cl. ..........................................G06f 3/06, G06f 3/10
[58] Field of Search ..........................340/172.5, 324; 35/5, 6

[56] References Cited

UNITED STATES PATENTS

| | | | |
|---|---|---|---|
| 3,501,746 | 3/1970 | Vosbury | 340/172.5 |
| 3,248,705 | 4/1966 | Dammann et al. | 340/172.5 |
| 3,080,661 | 3/1963 | Conrath | 35/6 |
| 3,360,781 | 12/1967 | Boehnke | 340/172.5 |
| 3,483,523 | 12/1969 | Cogar et al. | 340/172.5 |
| 3,533,076 | 10/1970 | Perkins et al. | 340/172.5 |
| 2,931,108 | 4/1960 | Brown | 35/5 |
| 3,364,473 | 1/1968 | Reitz et al. | 340/172.5 |
| 3,346,853 | 10/1967 | Koster et al. | 340/172.5 |

*Primary Examiner*—Paul J. Henon
*Assistant Examiner*—Sydney R. Chirlin
*Attorney*—Johnson, Dienner, Emrich, Verbeck and Wagner

[57] ABSTRACT

A data input preparation machine having keyboard means for use in entering data into buffer storage and processing such data to and from magnetic tape. The buffer storage includes a plurality of positions, each of which positions has storage means for both program and data information. Automatic verification means provide automatic verification of program entries at machine speeds, and memory and field backspace keys permit automatic backspacing to the previously keyed character of the most significant position of a field. The most significant position entries in the program section of buffer storage are also used for the LOF sequences for individual characters in such field, the transport being from the more significant positions of the field to the less significant positions of the field. Alphanumeric display means provide display of characters in a pattern identical to the character pattern on the keyboard; individual members for identifying the selected positions in memory, and alphanumeric program field identifiers all of which materially reduce operator time in the data processing operation. Novel register and memory arrangements using a reduced amount of equipment minimize the cycle process time for both program and data entry.

34 Claims, 38 Drawing Figures

Patented July 11, 1972 3,676,854
12 Sheets-Sheet 1
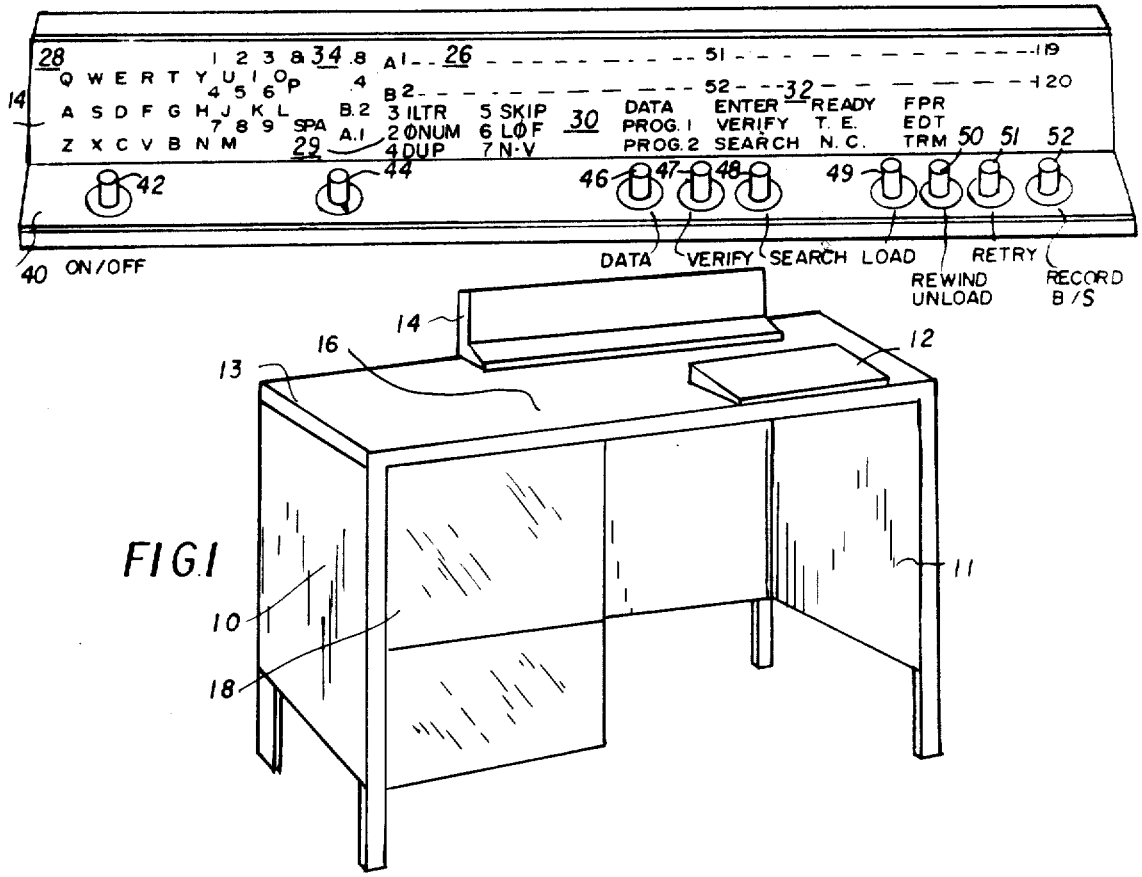
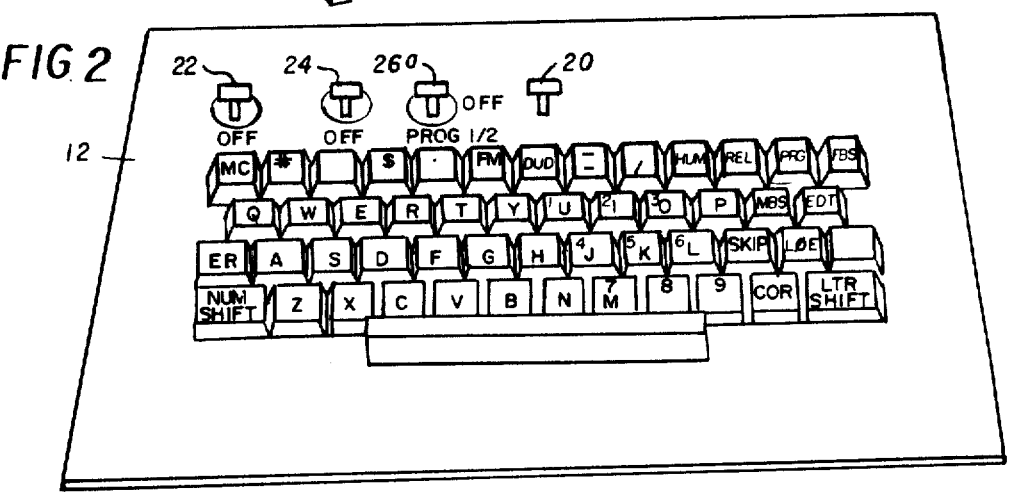
INVENTORS
HEINZ H. FINDEISEN
JAMES D. KALLMEYER
DAVID G. SOKOL
JAMES H. STEIN
THOMAS R. THOMAS
BY JACK R. BOWERS
ATTYS

Patented July 11, 1972

(Data station program card layout with columns: DATE, DEPT, CLOCK, SKIP, PLANT CODE, WAGE SCALE, HOURS, SKIP, NAME)

APPLICATION _____ PROGRAMMED BY _____ DATE _____

DATA STATION PROGRAM

PROGRAM CODES
SPACE-NUMERIC FIELD    4. DUPLICATE
1. LETTERS FIELD       5. SKIP
2. NUMERIC SHIFT       6. LOF
3. LETTERS SHIFT       7. ON VERIFY

PROGRAM 1
☐ ENTER
☐ VERIFY
☐ ENTER & VERIFY

PROGRAM 2
☐ ENTER
☐ VERIFY
☐ ENTER & VERIFY

FIG. 5

| MODE | SW.46 PROG 0 DATA | SW.47 ENTER 0 VERIFY | SW.48 OFF 0 SEARCH |
|---|---|---|---|
| PROGRAM ENTER | → | ← | ← |
| PROGRAM VERIFY | → | → | ← |
| DATA ENTER | ← | ← | ← |
| DATA VERIFY | ← | → | ← |
| SEARCH | ← | ↑THEN→ | → |

INVENTORS
HEINZ H. FINDEISEN
JAMES D. KALLMEYER
DAVID G. SOKOL
JAMES H. STEIN
THOMAS R. THOMAS
JACK R. BOWERS

BY

ATTYS

Patented July 11, 1972     3,676,854
12 Sheets-Sheet 3
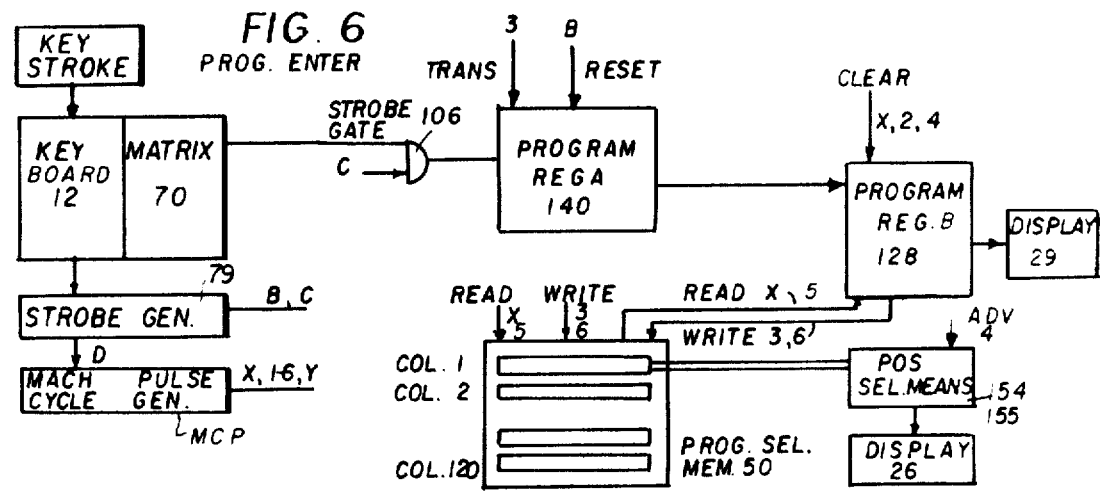
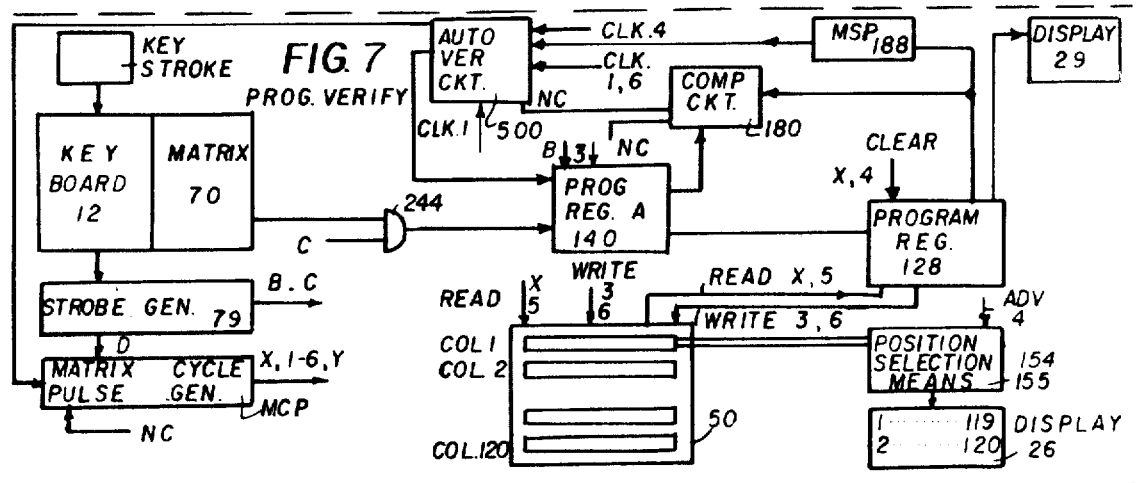
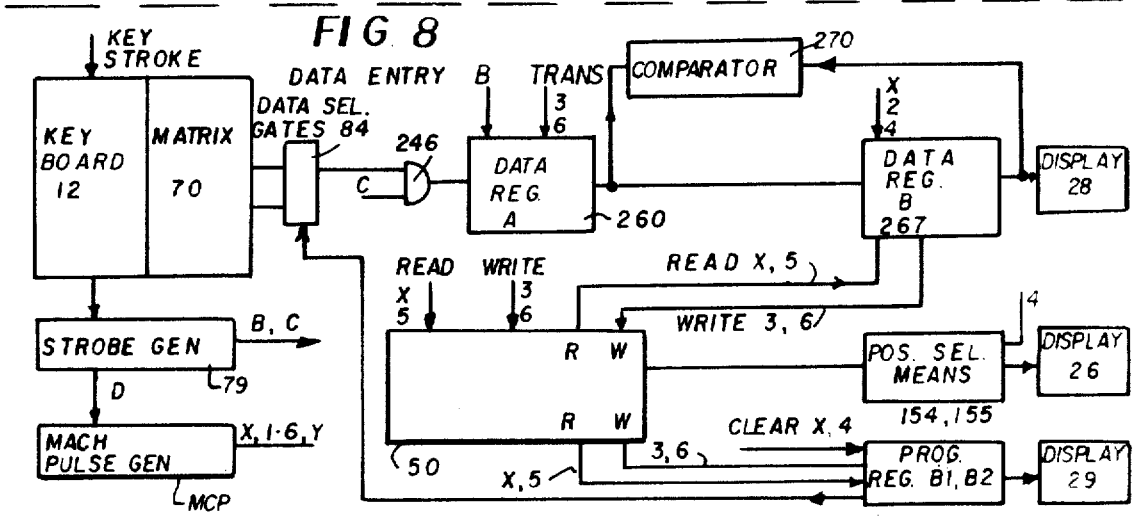
INVENTORS
THOMAS R. THOMAS    HEINZ H. FINDEISEN
JACK R. BOWERS        JAMES D. KALLMEYER
                             DAVID G. SOKOL
                 BY    JAMES H. STEIN
ATTYS Patented July 11, 1972

INVENTORS
HEINZ H. FINDEISEN
JAMES D. KALLMEYER
DAVID G. SOKOL
JAMES H. STEIN
THOMAS R. THOMAS
JACK R. BOWERS

BY Johnson Dienner Emrich Verbeck Wagner
ATTYS

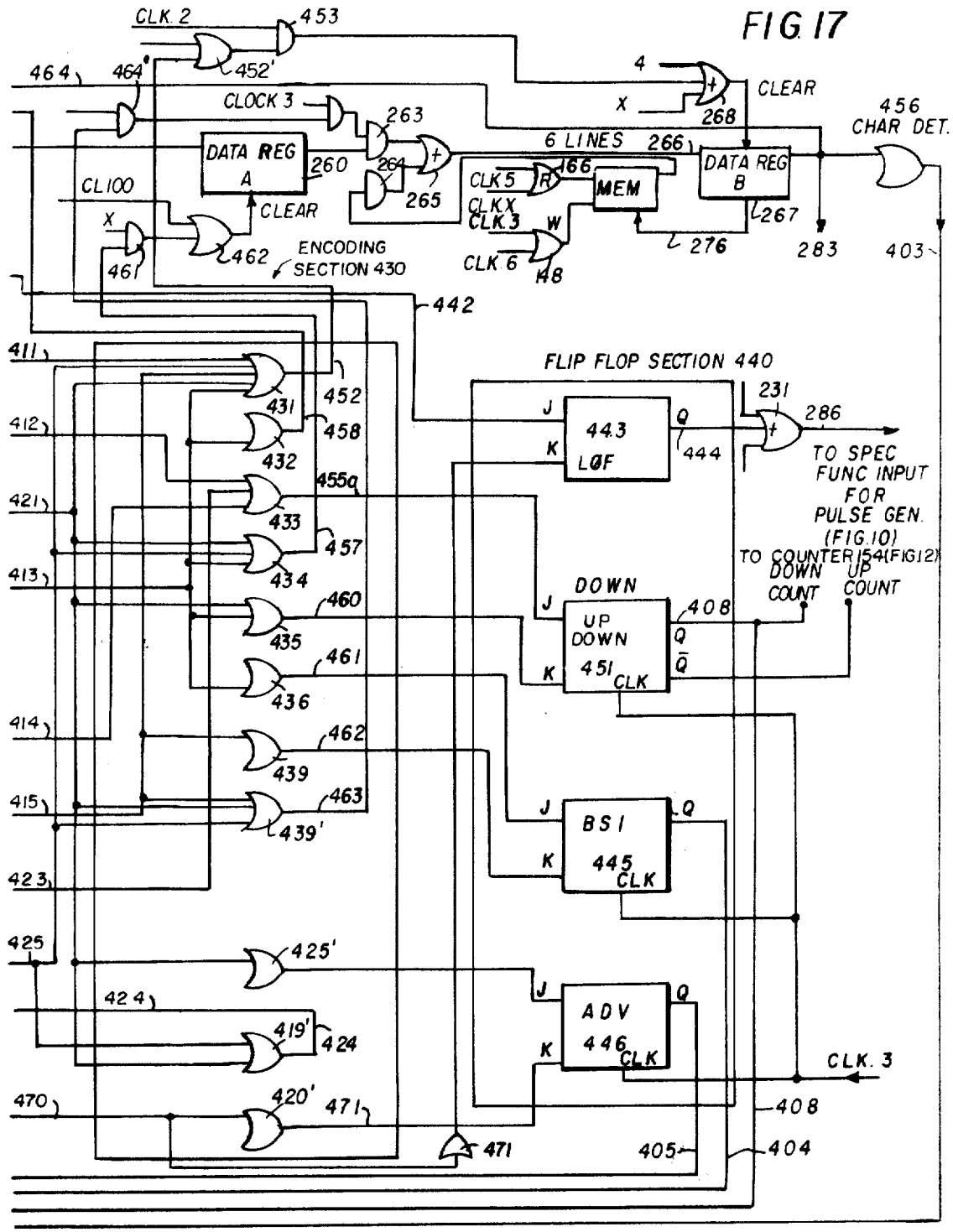

KEYBOARD TO TAPE DATA INPUT PREPARATION UNIT

BACKGROUND OF THE INVENTION

1. Field of the Invention

The present invention relates to data preparation input equipment having a keyboard for keying raw source data into a preparation circuit for storage on a computer compatible tape.

2. Description of the Prior Art

It is well known that the recordation of information or data on magnetic tape makes possible a more flexible and efficient use of computer equipment in data processing applications. With such knowledge, the art has turned to the development of equipment which is adapted for use in the direct entry of raw source information on magnetic tape in a computer compatible form.

While most units known in the prior art heretofore have included certain advantages from the standpoint of speed (which naturally flowed from the use of electronic equipment), the units did not constitute, in most respects, much more than a duplication of the existing mechanical card punch and key verifier equipment previously known in the field.

In the development of such prior art equipment, it would appear that emphasis was placed on duplicating the previously known mechanical equipment rather than on the provision of improved equipment which made possible an increased work output by the operator in the man-machine system. As a result, the prior art equipment has for the most part had built-in drawbacks and shortcomings.

By way of brief example, existing machines provide little in the way of information to the operator which pertains to the status or condition of the machine. Of similar import, the limited information which has been provided in known equipment is normally presented in a manner which is difficult for even a trained operator to assimilate and accept.

As a result of such basic shortcomings, operator training and procurement has been a problem to the users of such equipment. Again, by way of example, the electronic systems which replace the key punch and verifier equipment must necessarily operate in a number of different modes (as for example, program entry, program verification, data entry, data verification, and search modes). Each mode has different sequences of preparation and different sequences of operation and, as a result, indoctrination and training of an operator is necessarily time-consuming and costly. Further, since such systems normally provide readout of information from the machine in the machine language (normally binary coded information such as for example the nine level EBCDIC code) the problem of training operators to become efficient data preparers is difficult and costly. In areas in which employee turnover is higher than average, such shortcomings are of serious concern.

In addition to the increased training costs inherent in the use of the more complex equipment, it is reasonable to assume that the very complexity of the system also results in an increased error rate. Further, in the event of an error, the complexity of existing systems results in greater time periods for effecting error correction. All of these problems pertaining to error correction are further accentuated by the fact that in a complex system only limited information is made available to the operator, and in a form which is extremely difficult to assimilate and accept.

SUMMARY OF THE INVENTION

There is a need for, and it is an object of the present invention to provide, a keyboard to tape system which provides an increased amount of information to the operator for use in processing of raw data to a magnetic tape, and more specifically, to provide such information in a form which is readily understood and quickly assimilated by the operator.

It is a specific object to provide a readout to the operator, at any time, of (a) the identification of the position in memory at which the system is located, (b) the character stored in data memory, and (c) the character identification of the field as stored in program memory. Of like import the information is presented to the operator in alphanumeric form (rather than in the coded messages of the machine language) so that the operator may quickly accept the information provided by the system, and take such measures which are consistent with such information and to permit the operator to manipulate the equipment and data in a way which is most meaningful to the operator; rather than being clouded by machine oriented requirements.

According to one feature of the invention, the machine includes a display of a keyboard pattern of characters which is identical to the keyboard pattern which is used to enter the data into the system, and readout means which are selectively enabled to effect readout of the particular character in the display pattern which is stored in the data memory for the position to which the machine has been operated. Since the operator is well trained in the use of the keyboard there is no loss in training the operator to accept the character information presented on the keyboard in such pattern.

As a further adjunct to the operation of the system the novel display means includes a position identification display which consists of a number for each position in memory, the numbers being arranged in a recognizable sequence in horizontal rows, and means for illuminating the particular number which identifies the position at which the machine is located at any given time. Again, the operator may quickly ascertain, without need for a translation of coded information, the specific numerical identification as well as mechanical position of the data in memory.

As yet another aid to the operator, the novel equipment includes automatic program verification means which are operative to generate characters for the purpose of verifying an entire field by merely depressing the correct digit when the system is in the MSP position for such field. In such program verification mode the system, in addition to generating verification characters, uses such characters to search for any variation of the registered digits from those which are being automatically generated. In the event of a difference, the system stops at the position in memory which does not appear to have the proper character entry.

If the field has been properly entered during the program entry mode, the automatic verification will proceed to the end of the field, and thereupon halts, awaiting the depression of the key which corresponds to the MSP for the succeeding field. In a unit having 120 positions the operator may, in a typical example, only be required to verify 10 to 12 characters with the machine automatically verifying the remaining characters at the machine speed of approximately 50,000 bits per second (i.e., as compared to manual verification of 120 characters which is required in known machines).

The novel equipment also includes a field backspace key which permits the operator to backspace the system to the beginning of the particular field in which the system is operating. In cases of an operator error, as for example the entry of the wrong block of information in the field, the operator rather than backspacing a column at a time, need merely operate the field backspace key, and the equipment will automatically back up to the beginning of such field. Such arrangement is a further aid to the decrease of error correction time experienced in the normal prior art equipment.

The novel equipment also includes a memory backspace key. In case of operator sensed error, or for checking purposes an MBS key permits the operator to return to the previously keyed character in memory, one at a time in reverse succession. Characters in fields that have been entered or verified by automatic program means such as programmed duplication or programmed skipping cannot be accessed by this method. This prevents inadvertent erasure of data in such fields. It also allows the operator to have only one means of accessing this prior programmed manual key stroke location. Other equipment requires different procedures depending on the location and its relationship to the program.

The presentation and display of the information in the manner set forth above as an aid to the operator is made possible by a new and improved circuit arrangement for the system, and particularly by the novel combination and interconnection of register and memory circuits which result in a more expeditious access to the readout and display of the information in the system. The novel arrangement of the system components permits the use of a cycling sequence wherein only a single cycle of eight clock pulses X, 1–6, Y is required at each position of memory in any mode of operation to achieve the desired data entry. In addition, the novel circuitry also includes a novel and more efficient left zero fill circuit which results in an improved arrangement for effecting right justification of entries in a partly filled field and the filling of the unused columns with zeros.

BRIEF DESCRIPTION OF THE DRAWINGS

FIG. 1 is a perspective showing of the novel data station as mounted in and on a conventional secretarial type desk;

FIG. 2 is an enlarged version of the keyboard which is located on the top of the desk shown in FIG. 1;

FIG. 3 is an enlarged version of the display panel which is located at the back of the desk surface shown in FIG. 1;

FIG. 4 is an illustration of a typical program-planning card along with an exemplary program for entering data for tape storage;

FIG. 5 is a truth table for the mode switches of the data station;

FIGS. 6, 7 and 8 are block diagrams illustrating the sequence of operation of the equipment in the program enter, program verify and data entry modes;

FIGS. 16 and 17 illustrate the left zero fill circuitry used in the system.

GENERAL DESCRIPTION

Figure 9:
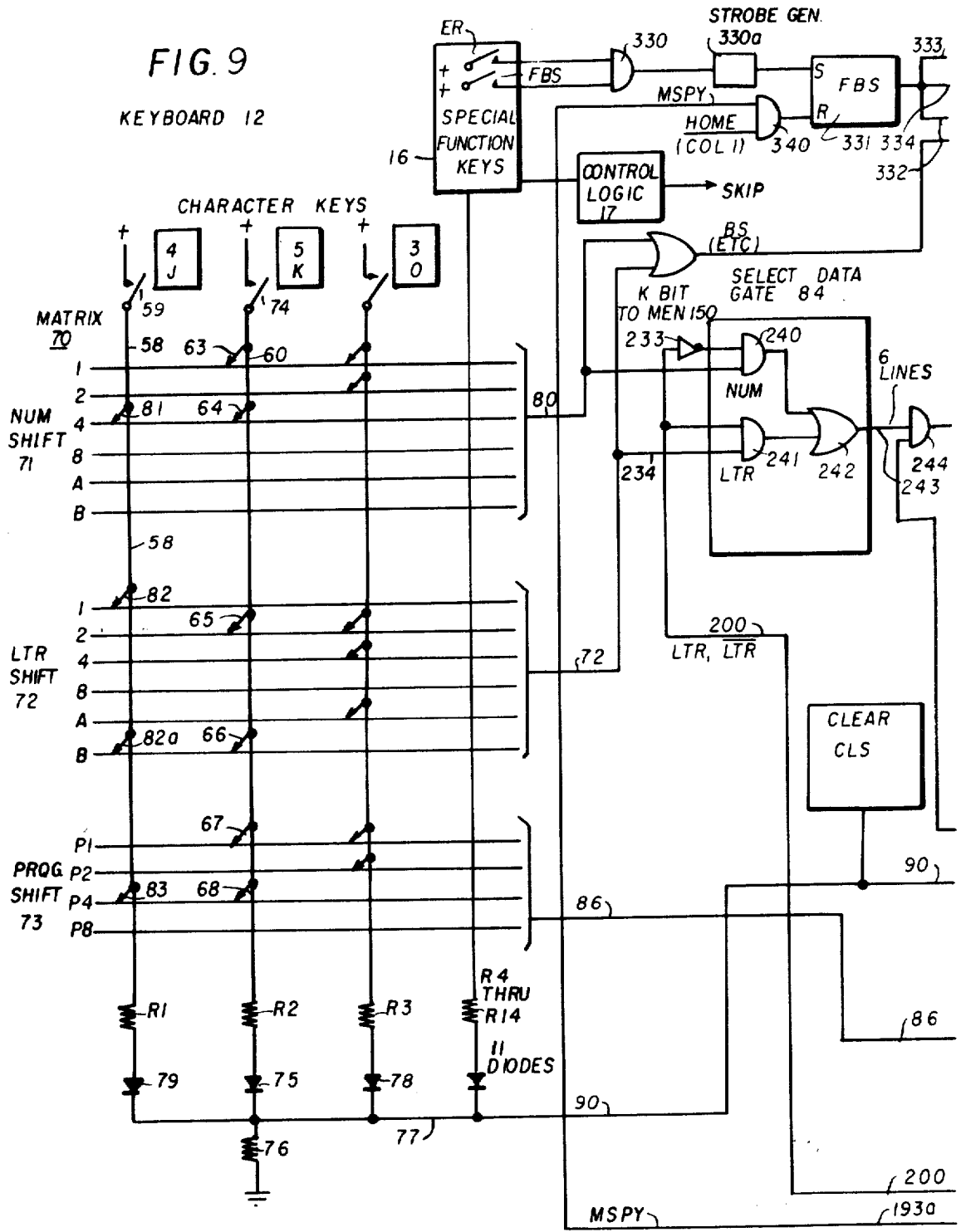
FIGS. 9–13 when assembled in adjacent relation set forth the circuitry of the data station in detail.

The data station unit, as noted above, is a device which prepares raw data for storage on a magnetic tape for ultimate use with computer equipment. In a preferred form shown in FIG. 1, the data station unit comprises a desk 10 having a knee space 11 and a top 13 which has a keyboard 12 located thereon for ready access by an operator when seated at the desk 10. A display board 14 displays information to the operator, the information displayed varying with the particular mode in which the system is being used at the time.

A reel to reel tape handler (not shown) is located in an upper desk drawer 18 located to the left of the knee space 11 provided in the desk 10. The tape deck during normal operation is located out of sight in the drawer 18. Rewind is initiated by a switch control and when complete, turns off to rewind the reel drive. Sensing devices are built in to detect reflector marks at the beginning and end of the tape for use in the automatic control of the tape.

A large area 16 on the desk top to the left of the keyboard 12 is provided for location of source documents from which raw data is obtained by the operator for keying into the system via keyboard 12. That is, (as will be described in more detail hereinafter), in the use of the data station 10 the operator visually reads out information from an original source document and operates the keyboard 12 to insert such information into a magnetic core memory in the system. As a predetermined amount of information—referred to herein as a unit record of data—has been entered into the memory via the keyboard (much in the same manner that a typist would type a letter or operate a conventional card punch), the unit record of data is automatically transferred from the memory to the tape. During the operation of the keyboard 12 to enter data into the memory, if the operator senses a keying error the operator need merely backspace and access the previously keyed position and the information in memory will be visually displayed whereby the operator can immediately make the necessary correction. Of particular significance, the display 14 indicates the character keyed in a direct alphanumeric readout so that little time is lost in translating coded information into recognizable characters. In addition the location of the characters on the display 14 are positioned relative to one another in a pattern which is identical to the pattern on the keyboard 12. Such positioned presentation is extremely useful in reducing the time required to correct operation-sensed errors during data entry.

With reference to FIG. 2, the keyboard 12 is shown to comprise a standard 47 character IBM coded decimal keyboard combining the features of a typewriter and a keypunch keyboard. The keys and numbers are arranged in four rows of alternately thirteen and twelve characters each with a number field (space) bar located at the bottom. The letter characters for the most part appear on the left hand side of the keyboard 12 and the number characters and special function keys appear on the right hand side of the keyboard 12.

The single markings are letter field keys and constitute an illegal key stroke in a programmed number shift. Error light 20 will flash in the event of such illegal operation by the operator. Keys with dual markings are dual character keys with the lower designations being enabled during a letters shift. The upper character markings are enabled when a manual NUM shift key is depressed. The remaining fifteen marked keys are special function keys which are used to modify the basic functions of the data station as will be described in more detail hereinafter.

Keyboard 12 further locates an AUTO.SKIP/DUP/OFF switch 22, which enables automatic skipping and duping for fields which are so programmed, a release switch 24 which enables a manual or automatic release to or from tape, and a REVERT-OFF-PROG 1/2 switch 26a which controls program selection. The specific operation of the switches 22, 24, 26 will be described in detail in a specific example which is given hereinafter.

With reference now to FIG. 3, the display console 14 is shown as comprising six different visual display areas or sections. The column indicator section 26 in the machine disclosed herein has 120 positions which indicate to the operator the one of the columns of information for which data is being entered. Each column of information has a corresponding position in memory, and the 120 positions in display sector 26 on console 14 identifies the particular position in which the next bit of information is to be entered as a result of a further key stroke on the keyboard 12. In the normal entry of successive characters in a manual field, each key stroke on the keyboard 12 normally advances the column indicator section 26 one position. However, as will be shown, in the entry of data in an automatic Skip or Dup field each key stroke advances the indicator over the automatic field to the column which has the next non-automatic beginning of field (MSP). The use of memory (or field backspace key) on the keyboard 12 will step the column indicator 26 backwards to the previously manually keyed character (or the MSP of a keyed field respectively as the case may be; or to the MSP of an auto entered field if the automatic switch is off).

A second display area 28 located on the left hand portion of the display board 14 presents a display of the alphanumeric and special characters of keyboard 12 arranged in the same pattern as the keys on the keyboard 12.

In use of the data station for data entry, display section 28 identifies to the operator with an illuminated background the particular character which is entered into the one of the memory positions which is identified by the column indicator 26. Since the readout is in the English language and the characters are located on the display section 28 in the same relative position as on the keyboard, the operator is able to determine the information which was previously keyed into memory in a more reliable and expeditious manner.

The display section 28 is also used during verification to display the character to be verified by the next key stroke, and the same advantages accrue to the user.

A program display section 29 identifies to the operator the nature of the program in use, from field to field, and is expressed in words and numbers which correspond to the program code, as will be shown.

A mode display section 30 on display console 14 includes lighted words DATA Prog 1, Prog 2, Enter, Verify, Search, whose combination indicate the functional mode of the machine. For example it indicates whether a program is being entered or verified, and which of the programs is enabled for the purpose. A Data lamp in the same section is illuminated along with the Enter or Verify word when data is being entered or verified. When the data station is conditioned for a search, the lighted word "Search" in area 30 will so indicate.

A status display 32 located on the display panel indicates when the data station is ready for operation by illuminating the "Ready" light. Such portion of the display also includes a "Tape Error" light which indicates whenever a tape write or readout error is encountered; a NON-COMP (non-compare) light which indicates during verification. If in a keyed Dup field whenever the data read from the tape does not match the data stored in core memory the non-compare identifies the error type. An EOT light to indicate that the end of the tape code has been reached, and a TRM light which indicates to the operator that the reflective marker on the trailer portion of the tape has been reached.

Display section 32 further includes an FPR indicator light which operates whenever the file protect ring is not installed on the reel when the equipment is in the Enter Data mode. That is, as will be shown, a file protect ring is used on the reels, and the system inhibits the Data Entry Mode without such ring properly located on the reel.

Display set 34 is the only coded display and is used to indicate the binary bit structure of the particular character which was previously entered in memory. Thus, if the numeral 5 is being displayed from memory, bit lamps 1 and 4 in area 34 will be illuminated to provide a visible indication of the bit structure in memory. This is normally used for bit structure verification of codes not corresponding to the keyboard character set.

A face plate 40 located along the bottom marginal edge of the display panel 14 mounts a group of console switches including an on-off switch 42 which is the master power switch for the data station 10, a record length selector switch 44 which allows the operator to select any desired record and program length in steps of 20 columns at a time (i.e., 20, 40, 60, etc., to a maximum of 240 in the illustrated unit), mode switches 46, 47 and 48 which provide five distinct operating modes for the data station as indicated by the identified positions, and tape control switches 49, 50, 51 and 52 which provide for control of various basic tape movements such as load, rewind, retry and record B/S (record backspace).

PROGRAM PROCEDURE

As indicated heretofore, the novel data station of the invention is used to prepare raw data for input to a computer unit, the operator using the keypunch keyboard 12 in the manner of a typewriter or keypunch keyboard to key the information into the data station which responsively enters the keyed data into an associated magnetic core memory for storage, until a complete record of data is entered.

Each such complete record is then transferred from the memory to the tape for use with a computer system, recording of the information on the tape being effected in the seven level BCD tape code (six data bits plus a parity bit using odd or even parity) or EBCIDIC etc. While the pattern of entry of the data will vary with the particular records which are to be kept, in most instances, it is desirable that the data be entered in a predetermined pattern and accordingly program control keys are provided to establish a format or program to be followed in transcribing data from the source document to the tape.

More specifically, programs which are entered by an operator with the keyboard 12 are stored in the section of the magnetic core memory devoted to the program instructions. Such instructions remain in a preassigned program section in memory until altered. Corrections or changes while keying in the program are made by simply back-spacing and keying in the correct program code. As will be shown there are eight memory cores for each position in the program memory portion, four each for programs 1 and 2. Each of the four cores are assigned to binary position designations 8-4-2-1. In the binary system each core is considered to be on or off, active or inactive. The "on" states are represented by 1 and the "off" states by 0. If the program code 3, for example, is entered in a particular column, it would be shown as 0011 at the 8-4-2-1 bit locations respectively.

Two programs, Prog. 1, Prog. 2, are provided in the data station of the present disclosure. The desired program is selected by operating the program key (PRG) on the keyboard, and the selected program is indicated by the program display in the area 30 on the display console. A further operation of the program key effects selection of the alternate program.

The "Revert-Off-Prog. 1-2" switch 26a controls programming functions. In the Off position, the data station is in the letter shift unless overridden by a manual number shift. This mode provides for entry of formatless records, and the like. In the Prog. 1-2 positions, selection of either program 1 or 2 is possible by means of the Program Key on keyboard 12. In the revert position, the system enables the automatic shift from Program 2 to Program 1 after a record is entered or verified under control of Program 2. The data station will remain under the control of Program 1 until the program key is used to enable Program 2 again, after which the revert action will occur again.

It is believed advisable for the purpose of more clearly understanding the functions of the data station unit to set forth at this time a typical program which may be used for record entry purposes.

PROGRAM CARD

With reference to FIG. 4, a typical program for key-entering of the data in a common pattern is shown thereat.

In the illustrated example, only 80 columns of the possible 240 columns available in the data station equipment will be used. Both Programs 1 and 2 will be used to illustrate the automatic duplicating feature of the system. The programs illustrated are of the type which might be used for payroll purposes and as indicated in FIG. 4 provide date, department, clock, wages, plant code, wage scale and hours information on each record, different records being used for different employees.

More specifically, in the example of FIG. 4, the columns in such program are divided into fields which include a date field (Columns 1-5), a department field (Col. 6-9), clock number (Col. 10-15), skip field (Col. 16-24), wage scale field (Col. 25-35), plant code field (Col. 36-46), wage scale field (Col. 47-54), hours field (Col. 55-58), a further skip field (Col. 59-69) and name field (Col. 70-80).

ENTRY OF PROGRAM 1

It will be observed that the data is normally gathered and placed in the selected column positions so that the particular information which can be repeated in the records for a number of employees will appear in the same portion of the record. Thus, in the present example, the payroll information which is the same for a large number of employees would include the pay rate, date and department. Likewise the plant code and wage scale may be the same for a large number of the employees. Since the information in such fields can normally be duplicated in the records for a large number of employees, and assuming that Program 1 is to be entered first, the operator will enter digit 4 (the duplicate digit as shown by the legend at the bottom of the program card) in the first column (or most significant position—MSP) for each of such fields. In the present example, digit 4 is entered in Column 1 of the date field, Column 6 of the department field, Column 36 of the plant field, and Column 47 of the wage scale field. The first column (MSP) for a numeric field which is not duplicated is normally keyed with the digit 2 and the subsequent columns of the numeric field are keyed with spaces (i.e., see the Clock field, Col. 10–15 in FIG. 4).

The first column (MSP) of a letters field is keyed with digit 3 (see Col. 70 in the name field) and the following columns of the letters field are keyed with digit 1.

In the entry of information pertaining to the date field, it is normal to use numeric designations (as for example 05/23/9). With reference to the program shown in FIG. 4, the operator keys the Dup. number 4 in the first column (whereby the date information will be automatically duplicated on a series of records, as will be shown), and keys "spaces" for the remaining Columns 2–5 of the numeric field which is used for "-DATE" information.

In a similar manner, the number 4 is keyed into Column 6 (the first column or MSP) of the Department field. Assuming the "Department" field is also a numeric field, the operator will key spaces into Columns 7–9 of the "Department" field.

The clock number which unlike the date or department information will change for each employee, is not a field which can be duplicated (i.e., each employee will have a different clock number) and accordingly the operator will key the code numeral "2" into the first or MSP column of such field (Col. 10) to identify the field as a numeric field, and will key spaces in the remaining Columns 11–15 of such field.

In the present example, Columns 16–24 are used to store other information which is not programmed at this time. As a result, the system is programmed to automatically skip over Columns 16–24 as the data is entered. Automatic skip is achieved by keying digit 5 into the MSP (Column 16) of the Skip field and keying spaces for the remaining columns 17–24 of the field.

The wage field, as in the case of the clock field, will have information which may differ from employee to employee, and accordingly the columns in the wage field are set up in the manner of the clock field (that is, the MSP of the field Column 25 is keyed with numeral 2 to indicate a numeric field, and the remaining Columns 26–35 are keyed with spaces to identify a numeric field).

The plant code field (Col. 36–46) and the wage scale field (Col. 47–54) are set up in the manner of the date and department fields so that duplication will be automatically provided as the successive records are made for the different employees on the plant payroll, and the hours field (Col. 55–58) is set up in the manner of the wage field. Columns 59–69 are assigned to a skip field which is set up in the manner of the previous skip field (Col. 16–24). The employee name field (Col. 70–80) has been set up as a letters field and accordingly the letters code (3) is keyed into column 70, and since the following columns 71–80 of the employee name field will have letters, code numeral 1 is inserted in columns 71–80. At this time program entry is complete.

VERIFICATION OF PROGRAM 1

With Program 1 now entered, it is normal for the operator to verify the program entry. In so doing, the operator sets the enter-verify switch 47 (FIG. 3) to the verify position and depresses both the ERR and the HOM keys on keyboard 12. The Program 1–Verify lamps in display section 32 are illuminated, and the system automatically returns to Column 1 Program 1 in memory. The lamp behind digit 1 of the column display section 26 is now illuminated and digit 4 is illuminated on display section 28, and the "4 DUP" legend in display section 29 is lit.

The operator now strikes key "4" and the machine compares such number with the number stored in the memory cores for column 1 of Program 1. Assuming a valid comparison occurs, the machine advances to the column 2. According to a feature of the present invention, it is only necessary to verify the information at the most significant position (MSP). The remaining columns in each field (which normally contain spaces or 1's, depending on the MSP) will be automatically verified at a machine speed of 20 microseconds per column. Before each MSP is key-verified, the program display will indicate the type of field by lighting up the appropriate number and word on the display section 29, and the appropriate number on display section 28. Any noncompare will light the error light 20 (FIG. 2) and lock out the keyboard 12. In such event the operator operates the enter-verify switch 47 back to the enter position and depresses the proper key to correct the error. After error correction the enter-verify switch 47 is retunred to the verify position so that the verification may continue. It will be apparent that in the present example it is necessary during verification to enter the MSPs for only ten columns and that the other 70 columns will be automatically verified, unless a "0" follows a "3" or a 1 follows a 2, 4, 5, 6, 7 (8, 9, 10,etc.) in which case the error light is extinguished and the field must be keyed out manually, whereby a substantial saving in operator time is effected during program verification.

ENTRY OF PROGRAM 2

After entry and verification of Program 1, the operator depresses the ERR-HOM keys and the program key on keyboard 12 (FIG. 2) to select Program 2, and operates switch 47 to the Enter position. The display sections illuminate the lights for Column 1, Section 26; Program 2, Enter, Section 30; Sections 28 and 29 display data from previous entry. As shown in FIG. 4, the automatic duplicate fields (those fields identified with the numeral 4) in Program 1 are numeric fields and are identified in Program 2 by keying the digit 2 for the MSPs of such fields (i.e., Col. 1, 6, 36 and 47). The operator also keys digit 5 for MSP of the skip fields (Col. 16, 59) digit 6 for the MSP of the LOF field (Col. 25), and digit 3 for the MSP of the letters field (Col. 70). Spaces or ones as appropriate are entered on the field following the MSPs. After entry of Program 2, the system is returned to the start position (Col.1) by operation of the ERR-HOM keys. Program 2 is now verified in the manner of Program 1 as described above.

DATA ENTRY

The operator now prepares to enter the data for the first employee (i.e., while the system is still in Program 2 condition) by operating the Prog-Data switch 46 (FIG. 3) to the data position.

Assuming the date for the payroll entry in the present example is 05/23/9, the operator will operate the keys 0, 5, 2, 3, 9, in that order and the machine effects entry of such data in cores for Columns 1–5 in the date memory for program 2. Department information and clock information is entered in like manner in Columns 6–9 and Columns 10–15 respectively. As the system is advanced to Column 16 the data station circuitry automatically skips to Column 25.

Assuming the calculated wages for the employee are $43.21, the operator strikes keys $, 4, 3, ., 2, 1 and the LZF (left zero field) key and the machine automatically fills Columns 25–31 with zeros and places the amount $43.21 in Columns 30–35.

The manner of entry of the remaining date (plant code, wage scale, hours, name) will be obvious from the foregoing description.

As the data for Column 80 is entered, the data station circuitry automatically releases the data block (i.e., the data entered for Columns 1–80) to the tape and returns to the home position (Column 1) and then advances to the first non-duplicate or non-skip MSP. Assuming the switch 26a (FIG. 2) was in the revert-position, the system now automatically reverts to Program 1. Since the data field (Column 1 of Program 1) has duplicate code 4 in the MSP, the circuitry will automatically duplicate the information which is stored in the corresponding field in Program 2. The department information (Columns 6-9) will likewise be duplicated, and the machine automatically advances to Column 10 (the MSP for the clock number field of the second employee). Thus the operator only needs to key in data in the field in the successive blocks which do not constitute duplicate information.

As the information for one department has been completed, and information for employees of a different department is to be entered, the operator can simply change to Program 2 by pressing the program key, depressing the ERR-HOM keys on the operator keyboard 12, and advancing the system to the MSP of the department field (Column 6). At this time, the operator merely depresses the new department number. After entry, the operator once more operates the Program key to select Program 1 for the purpose of entering the information for the first employee of such department. When the operator completes entry of a block of data (i.e., when the last Column 80 is keyed), the machine automatically transfers the record from the data memory to the tape. When a successful transfer of data is made from memory to tape, the machine advances to position 1 for the next record entry.

If the transfer to tape is unsuccessful, the tape error light in display section 32 and error light 20 on the keyboard panel will be illuminated. In order to rewrite the record on tape, the retry switch 51 (FIG. 3) on the console 14 is pressed momentarily to enable a backspace, erase forward, write, backspace, forward read tape motion. Assuming the rewrite is now successful, the ready lamp will be illuminated.

Operator sensed errors may be corrected during data entry by backing up the memory and rekeying. The operator may back up to the previously keyed character position by using the ERR MBS keys on keyboard 12 or may back up to the beginning of the field by using the ER FBS key on Keyboard 12, or by backing up to the beginning of non-automatic fields of the record by using the ERR HOM keys on keyboard 12.

DATA VERIFICATION

After the completion of entry of a file of information, the operator verifies the data which was entered. To verify a record, the operator operates the Prog-Data switches 46 to the Data position, and the Enter-Verify Switches 47 to the Verify condition. Assuming the program 1 is to be used in verification the program key is depressed to select program 1 and the release key is operated to read the data on the tape back into the date memory. The operator now keys in the data from the source document, and each key stroke results in the comparison of the keyed character with the character which is stored in memory. The data display section 28 illuminates the character in memory to be verified while the program display section 29 indicates by number and words the nature of the active field. As long as the keyed character matches the character in data memory, the memory position indicator 26 advances one step with each key stroke.

With the automatic Skip/Dup switch 22 (FIG. 2) in the automatic position, the program skip and dup fields are machine verified. A programmed LOF field will be machine verified up to the first non-zero character, regardless of the position of the automatic skip/dup switch.

In an error condition is detected, i.e., (the key stroke character and the character in memory do not compare) the error lamp 20 will light and the keyboard 12 will be locked out and the column indicator 26 will not advance. If the operator checks the character display and establishes that there is an incorrect character, she may correct such error by operating the ER/COR keys on keyboard 12 before the proper key stroke is made. Such operation will correct a single character in memory and the verification may continue. If the operator has merely miskeyed during the verification, she simply hits the ER key and keys the correct character.

By way of brief summary, it will be seen from the foregoing description that the codes which are used in the machine operation include letter and number shift codes (2 and 3), field definition codes (space and 1), automatic skip and automatic duplication code (codes 5 and 4), left zero field codes (code 6), non-verifying code (code 7) all but 0-1 serve as stop codes.

The use of the "space" and code digits 1-5 in a program will be apparent from the foregoing above example. Left zero fill code 6 as indicated above is used to identify the most significant position of a numbers field and to right justify significant numbers. The code 7 which need not be verified is used to identify the most significant position of a numbers field during data entry.

MODES OF OPERATION

The foregoing description sets forth typical steps which may be taken by the operator in the entry of payroll data from source documents into the machine for recording directly onto computer compatible magnetic tape in a predetermined pattern. In such example, the steps performed by the operator in program and data entry and verification were outlined. In addition to its use in the data and program entry modes, the system may also be used in a search mode when it is desired to find one record out of the many records which have been placed on the tape. In such search, the information in data memory in the form of an identifier record is compared with each record at the rate of approximately 2,448 records of 100 columns per minute. When the desired record is located, the search is automatically terminated.

The selection of the particular mode of operation for the data station as noted above is effected by appropriate operation of the three mode switches 46, 47, 48 (FIGS. 3 and 5a) each of which has two positions, and which have functions which are illustrated by the truth table set forth in FIG. 5b.

As an aid to understanding the specific circuitry set forth hereinafter, a block diagram of the program and data entry and verify modes is set forth in FIGS. 6, 7 and 8 and is briefly described hereat.

ENTRY MODE

As indicated above, in use of the system the operator initially prepares and enters a program or programs (such as Programs 1 and 2 shown in FIG. 4 for example) into the system. In the entry of a program, such as illustrated Program 1, the three switches 46, 47, 48 (FIG. 3) are operated to the upper position as viewed in FIG. 5a. Additionally the record select switch 44 (FIG. 3) will be set to the desired record length (position 80 for the eighty column card shown in FIG. 4). The revert switch 26 on the keyboard 12 (FIG. 2) and the program key are next operated to condition the system for entry of Program 1.

Assuming that the system has been conditioned for entry of Program 1 as indicated, it will be recalled that in entering Program 1, (FIG. 4), the operator will initially depress the numeric key 4 on the keyboard 12.

With reference to FIG. 6, the system in response to the keying of digit 4 on keyboard 12 controls associated circuitry including a strobe generator 79 to provide pulses B, C which clear or reset an associated program register A (140) and strobe gate 106 to forward the code for the depressed key from matrix 70 to the cleared A register 140. Pulse D output from strobe generator 79 is generated with release of the operated key by the operator (key 4 in the present example) and pulse D as generated enables machine cycle pulse generator MCP 6 to generate eight successive clock pulse X, 1-6, Y to effect a predetermined operation of the system circuits. More specifically, with the generation of clock pulse X during program entry, program register B (128) is cleared, and the information stored in the cores for Column 1 of Program 1 in memory 50 is transferred from such cores to the B register 128. Clock pulse 2 input to Program B clears the information as registered in Program Register B (128), and pulse CLK 3 transfers the information (digit 4) stored in Program Register A (140) to Program Register B(128) and thereafter transfers the digit 4 from Register B to the memory cores assigned to Column 1 for Program 1. Clock pulse 4 of the cycle clears Program Register B and advances counter 154 to select the group of cores which are assigned to Column 2 of Program 1 in memory 50.

The second column indicator light 2 in display section 26 is illuminated as counter 154 advances to such position in memory 50, and the system is now conditioned to receive new information for Column 2, Program 1. The information presently stored in the cores for Column 2 of Program 1 (if any) is displayed on Section 28 of display console 14. Clock pulses 5, 6 and Y effect operations which are not in point during the program entry mode.

The system circuitry is operative in such manner with each successive key stroke by the operator to generate pulses B,C,D,X,1–6,Y and thereby load the successive columns 1–80 of Program 1.

VERIFICATION MODE

In the use of the system to verify Program 1 which was entered in memory 50, the operator now sets the switch 47 (FIG. 3) to the verify position (switches 46, 48 remain in the program and off position respectively), and then operates the ER-HOM key on keyboard 12. As a result, the machine will automatically move to position 1, and by a machine cycle effect the display of the number stored in the cores of memory 50 for the first column (digit 4 in the present example). The Program 1 and verify legends in display section 30 (FIG. 3) will be lit.

With specific reference now to FIG. 7, a block diagram is used to illustrate the successive steps of the equipment in effecting verification. More specifically, as the operator depresses the ER-HOM keys, (recalling that the digit 4 is stored in Column 1 of Program 1 in memory), the strobe generator 79 generates pulses BCD and pulse B clears Register A, Pulse C strobes gate 106 without effect and Pulse D enables machine cycle pulse generator MCP to provide clock pulses X, 1–6, Y. As the pulse cycle proceeds to the pulse CLK 4 (the pulses CLK 1–3 being without significance at this time other than to clear Registers A and B), the counter 154 is reset to position 1, and on Pulse CLK 5 the information in Column 1 (digit 4 in this example) is read into Program Register B for display purposes in Section 29 of display console 14. The digit 4 in Program Register B is also applied to the comparator circuit 180 and the MSP detector circuit 188. Such circuit in detecting digit 4 prepares the automatic verification circuit 500 for operation in the event the operator presses the proper key in the next verification step. Pulse CLK 6 reads the digit 4 back into Column 1, Program 1 of memory, but does not clear the information from the Program Register B. As a result digit 4 will now be lit on the display portion 28 of console 14 and the 4 DUP legend on the display section 29 will be illuminated awaiting further action by the operator.

As the operator now depresses key 4, the system operates as described in the above example to provide pulses B, C and D which result in the reset of the Program Register A (140) by pulse B, and strobing of gate 244 by Pulse C which results in passage of the code for digit 4 from matrix 70 to the Program Register A. Digit 4 as stored in Program Register A by pulse C appears at compare circuit 180 for comparison with the character in Program Register B1. If comparison occurs, output conductor NC to the automatic verification is marked with logic 0. With the release of the key for digit 4 by the operator, pulse D from strobe generator 79 initiates the machine cycle by generator MCP to effect the generation of eight successive clock pulses X, 1–6, Y in sequence.

With the generation of pulse CLK X, program register B is cleared, and the digit 4 in the cores associated with column 1 in Program 1 in memory is once more transferred to the cores in Program Register B. In addition pulse CLK 1 is inhibited at gate 220 by the "0" signal on conductor NC, thereby permitting the automatic verification circuit 500 to initiate another machine cycle via conductor 230. If a "noncompare" occurs, move to the next address will be stopped by an output signal from compare circuit 180 over the NC lead logic which inhibits CLK 4 to the counter 154. However, assuming no noncompare occurs, the cycle proceeds with pulse CLK 2 which is without effect in this cycle, and pulse CLK 3 writes the bit which was in Program Register B back into the cores for Column 1 in Program 1, and pulse CLK 4 advances the counter 154 to Column 2 of Program 1. As pulse CLK 5 occurs, the information placed in Column 2, Program 1 of memory during the program entry mode (a space) is read into Program Register B1 for display purposes and pulse CLK 6 writes the same information back into Column 2, Program 1 without disturbing such information on Program Register B1.

Pulse CLK 6 to the automatic verification circuit 500 also enables the same to provide a space bit to Program Register A. With pulse CLK 6 (and assuming comparison occurred so that the circuit 500 has been prepared) the automatic verification circuit 500 provides a repeat signal to initiate a further cycle of the machine cycle pulse generator MCP and the automatic verification of the information in Column 3, Program 1.

Without repeating the details, the initiation of the next cycle of pulse generator MCP by the verification circuit 500 in this manner is the same as the operator depressing the space key, and the cycle will be effective in such manner to compare the space bit placed in Program Register A by the automatic verification circuit 500 with the space bit placed in Column 2 of Program 1 memory by the operator during the program entry mode.

Such manner of operation continues until a further MSP is detected by the detector circuit 188. At such time the automatic verification is terminated, and the MSP detected is displayed to the operator in the particular column in which the MSP has been stored.

The operator now keys the MSP indicated by the program card and in the event of comparison therewith of such keyed digit (digit 4 in Column 6 in the present example), the machine will proceed with the automatic verification of the subsequent Columns 7–9 in the second field in the manner just described.

The system circuitry continues in such manner to automatically verify the columns of a field after each successive MSP for such field has been keyed in by the operator until each of the fields on the card have been properly verified.

In the event that a nonverification is detected, the machine will complete the cycle in which it is engaged, and stop to permit the operator to correct an error in the described manner. For automatic verification of program fields MSP 3 need be followed by 1 (letter field) and MSP's 2, 4, 5, 6, 7 followed by 0 (NUM Field). Other fields can be used but not for automatic verification. MSP's 2, 4, 5, 6, 7 are defined as NUM shift program codes.

DATA ENTRY MODE

In the date entry mode, the system is conditioned for the receipt of data via the keyboard as operated by an attendant which data is placed in the data section of memory 50, bit by bit, until a complete record has been keyed into the station. As a complete record is entered into memory (80 columns in the present example), a release action occurs to enable transfer of the record from the data section of memory 50 to the tape.

With reference to the block showing in FIG. 8, the operator after placing the system in the data entry condition for Program 2 and operating the ERR-HOM keys to return the system to Position 1 now depresses the proper key on keyboard 12 for the character to be entered. In the example of FIG. 4, the DATE field appears first and assuming the date to be entered is 05/23/9 the operator depresses key 0. As a result of the key stroke, strobe generator 79 provides pulse B as a reset signal to clear the data register A (260) and a pulse C which strobes gate 246 to cause entry of the keyed character 0 in binary form into data register A for storage therein. As the key is released by the operator, strobe generator 79 provides pulse D to machine cycle pulse generator MCP which responsively provides cycle pulses CLK X, 1–6, Y.

The pulse CLK X clears the data and program B registers 267, 128a, 128b respectively, and effects reading of the data and the program information for the selected column (Column 1 in the present example) from memory 50 into the data register B (267) and program registers B1, B2 (128a, 128b). Pulse CLK 2 of the cycle clears the data information from the data B register 267 (the program information is not cleared from the program register B). On pulse CLK 3 the information in the date A register 260 is fed to the date B register 267 and thereafter the data and program information are transferred or restored from the data register B (267) and program registers B1, B2 (128a, 128b) into the respective sections of memory 50; at pulse CLK 4, the data register B (267) and the program register B1, B2 (128a, 128b) are cleared. Pulse CLK 4 also advances the counter 154 to the next memory position (Col. 2). Pulse CLK 5 reads the information in the core memory 50 for Column 2 into both the data register B (267) and program registers B1, B2 (128a, 128b) and thereafter at pulse CLK 6 writes the information in data register B back into the data and program sections of memory 50 without destroying such information on the data and program registers B1, B2.

It will be apparent that during the period that the information is registered in data register B, the keyboard pattern on display section 28 of console 14 is energized to provide a readout display for the attendant indicating the information which is stored in the column identified on the display section 26. In addition the display section 26 indicates the column which has been selected and display section 29 indicates by numbers and words the active field.

DETAILED CIRCUIT DESCRIPTION

The data station circuitry is shown in more detail in FIGS. 9–13. With initial reference to FIG. 9, three of the character keys J,4; K,5; O,3 of the 35 keys on keyboard 12 (FIG. 2) are shown connected to the vertical and horizontal conductors of coding matrix 70. With depression of a key such as K,5, and closure of associated contacts 74 potential is applied to vertical conductor 60 to generate a signal in the binary code for transmission over (a) program path 86, (b) number data path 80 and (c) letter data path 72 for selective gating to the system circuitry. Key closure path 90 is also enabled to initiate a cycle of the system.

More specifically, matrix 70 is basically comprised of three different sections including the number shift section 71, the letter shift section 72 and the program shift section 73.

The number section 71 includes a first set of six horizontal marking conductors of the matrix 70 which are identified as 1, 2, 4, 8, A, B, respectively. The letter section 72 has a similar set of six horizontal matrix conductors 1, 2, 4, 8, A, B and the program shift section 73 has a set of four horizontal matrix conductors (1, 2, 4, 8). Each key such as 5,K has its contacts such as 74 connected to a vertical conductor such as 60 which in turn is selectively connected to the ones of the horizontal conductors of each group in sections 71, 72, 73 which will result in a code output from the matrix 70 to the register equipment which identifies the one of the keys which has been operated. Key 5,K, at its contacts 74 as operated, for example, connects potential via vertical conductor 60 and diodes 63, 64 in the number section 71 to horizontal conductors 1, 4 to represent the number 5. The same key in the same operation connects potential via vertical conductor 60 and diodes 65, 66 in the letter section 72 to the horizontal conductors 2,B (which in the IBM 47 character BCD code represents the letter K), and further connects potential via vertical conductor 60 and diodes 67, 68 to horizontal conductors 1 and 4 in the program section 73 to mark the digit 5 in the program section.

Thus with each operation of a key, such as illustrated key 5,K, corresponding ones of the horizontal conductors in the three sections 71, 72, 73 of matrix 70 are marked to indicate the operated ones of the keys.

Each key such as 5,K is also connected over a diode such as 75 and resistance such as 76 to ground, whereby closure of a key, such as key 5,K will result in application of a 2 volt potential signal over conductor 77 and conductor 90 to the strobe generator 79 for the system which initiates a cycle of the equipment in a manner to be described. The manner in which the other 34 character keys of keyboard 12 are connected to the matrix 70 will be readily apparent from such illustration.

Keyboard 12 also locates 15 special function keys 16 each of which is connected to control logic 17 to provide a specific operation of the system. Since such functions are special states not necessarily involved in the basic system operation, discrete showings of such circuitry is not believed to be necessary. It will be apparent however that 11 of the 15 function keys 16 also effect an output signal over conductor 90 to the strobe generator 79 to initiate a machine cycle in the same manner as the other character keys.

When two or more keys are held depressed simultaneously, this voltage will be higher and will be detected by level detector 93 to indicate a "double key closure." Such double closure is normally an operator error and the condition is signalled to the operator so that she may strike the desired key only.

While each of the three matrices 71–73 may be marked each time a key, such as 5,K is operated, the information from only one section is used at any given time, the selected information being determined by the operating mode of the machine at the time. The program section markings are used, for example, only when the system is in the program entry or program verify mode as determined by the settings of switches 46, 47, 48 (FIG. 3). The information marked in the number and letter shift sections 71, 72 is used whenever the system is in the data entry or data verify mode depending on the shift selected.

Figure 10:
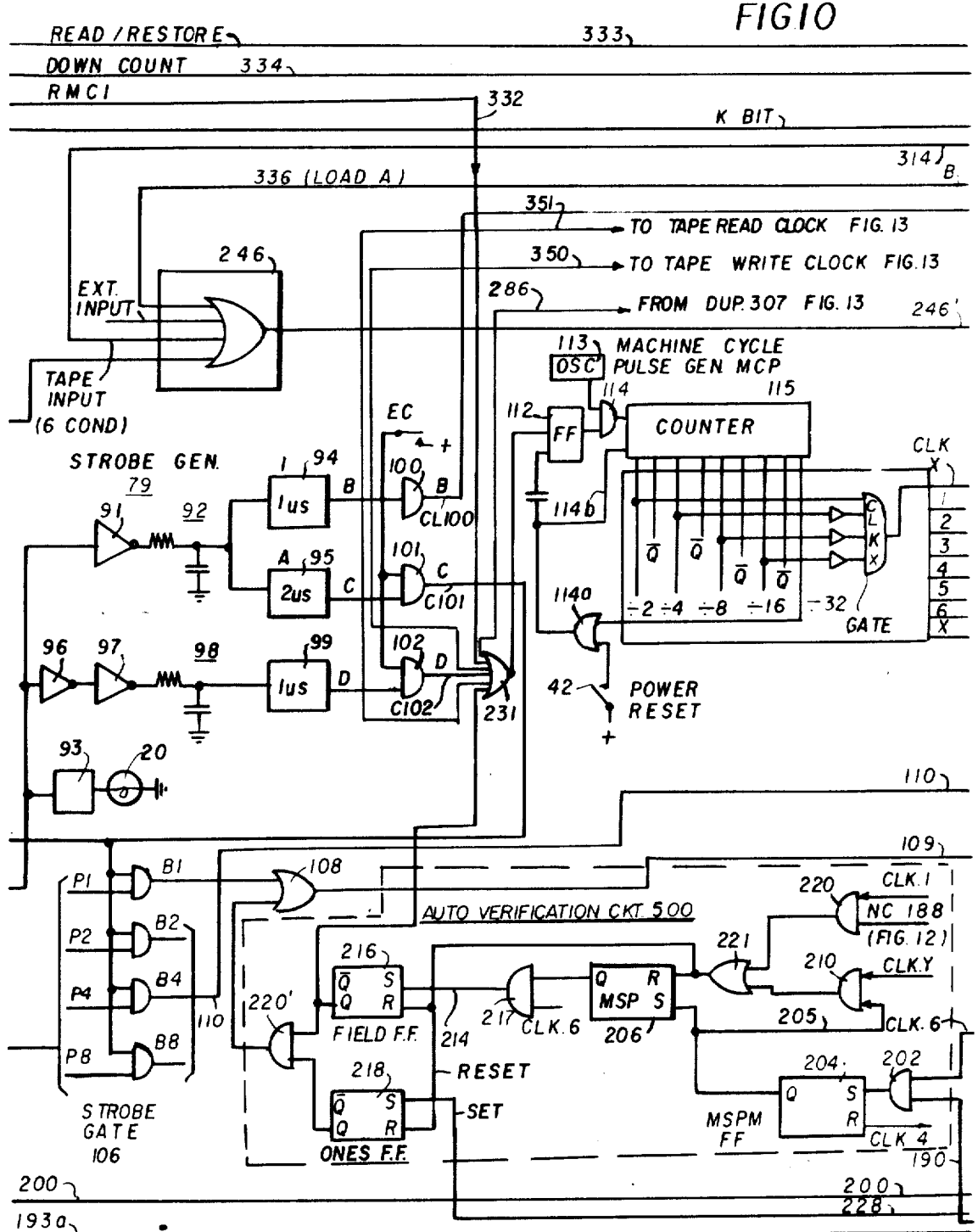
Figure 11:
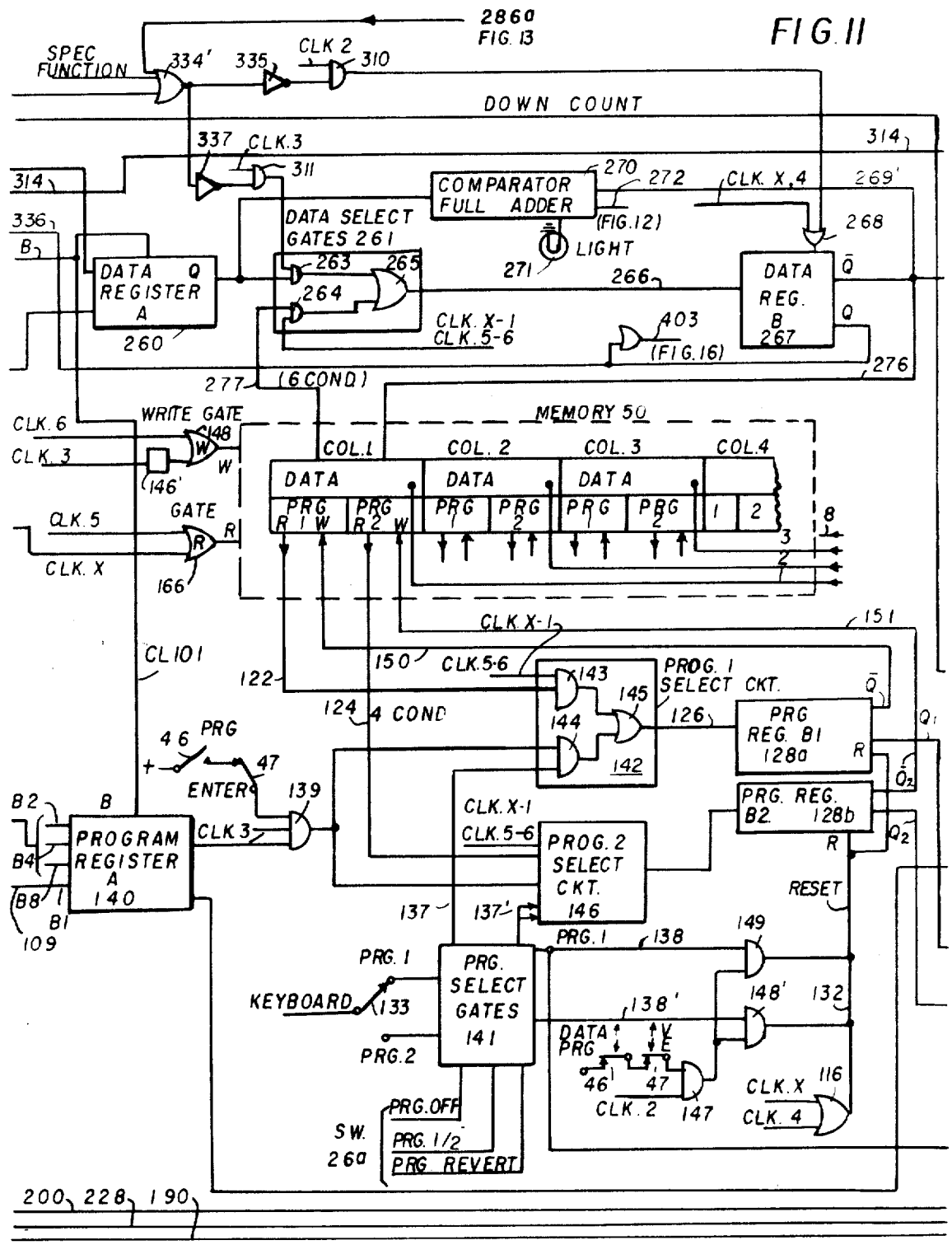

During the period that a program is being entered, for example, the markings on the program shift section 73 will be fed over the four conductors 86(FIG. 9) and strobe gate 106 (FIG. 10) for storage in the program register A (FIG. 11) in a manner to be described. Alternatively, if the mode selection keys 46, 47, 48 (FIG. 3) have been operated to place the equipment in the Data Enter or Verify positions, the date select gates 84 are enabled to extend the markings on number section 71 or letter section 72 to gate 246 (FIG. 10) and data register A (FIG. 11). It will be apparent that because of this arrangement Data or Program instructions can be transferred to core independently of each other. That is, one can change program instructions without changing data in memory.

Operation of the select data gates 84 is basically determined by the program which was previously entered into the system. Thus if the system is in column 1 position, and the program indicates that a number should be entered, the program circuitry (to be described) will place a logic 0 over conductor 200 (FIG. 9) which as inverted by inverter 233, will enable the number AND gate 240 to extend the markings on the matrix conductors 1, 2, 4, 8, AB for the number group 71 in the direction of the data registers, and will simultaneously inhibit letters AND gate 241. Alternatively, if the program indicates that a letter is to be fed to the data register A, logic 1 input over conductor 200 and the inverter 233 to the number AND gate 240 will inhibit the number output from the number shift section 71 of the matrix 70, and the same logic 1 signal input to letter AND gate 241 will result in transmission of the markings on the horizontal conductors of matrix 70 for the letter shift section 72 over path 234 and gate 241 to path 243 for transmission towards the data register group. While gates 240, 241 have been illustrated as single gates, it will be apparent that such gates are actually six gates arranged in the manner of strobe gates 106 (FIG. 10). Such simplified showing is used for gates 240, 241 and for other gates hereinafter to significantly reduce the number of drawings and description, it being apparent to one skilled in the art as to how such gates would be connected.

OPERATION OF CIRCUITRY IN PROGRAM ENTRY

As indicated above, in one mode of operation the operator enters a program into the system for the purpose of enabling the operator to thereafter feed raw information into the data station in accordance with the predetermined pattern set up by the program. A program, as entered, is placed in the core storage of a memory and remains there until charged by a new program entry.

In entering the exemplary program shown on FIG. 4, for example, the power switch 42 (FIG. 3) is turned on to energize the power supply for the system (not shown), and the record selector switch 44 is set to the position which corresponds to the record length selected (80 in the present example). The machine is conditioned for program entry of the program by operating the mode switch 46 (FIG. 3) upwardly to the program position, the second switch 47 upwardly to the enter position, and the search switch 48 to the off position. It is assumed that the tape has been loaded and the FPR ring has been installed, so that the Ready lamp in the display section 32 is illuminated and the FPR lamp is out.

The program key is operated if necessary to select program 1 (the machine will normally select 1 when the system is turned on—however, if it did not it is only necessary to depress the program key once) and the ER-HOM key is depressed. At this time, as will be shown, the system operates to the first record position, and the lamp for Column 1 in the column indicator 26 (FIG. 3) on the display board 14 will be illuminated.

As shown in FIG. 4, the digit 4 is to be entered in Column 1 for Program 1. Accordingly, the operator now depresses key 4,J to close contacts 59 and place positive potential on vertical conductor 58 to mark the third horizontal conductor 4 in the number group 71 and program group 73 over diodes 81, 83 respectively. In addition, such key operation results in marking of the first and sixth horizontal conductors (1,B) in the letters group 72 over diodes 82, 82a. The closure of key 4,J will further result in a signal over diode 79, path 77, and conductor 90 to the strobe generator 79 to initiate a machine cycle.

While the markings in numbers and letters section 71, 72 are also extended over paths 80, 72 respectively, such markings are without effect. That is, gate complex 84 will extend the markings on one of the paths 80, 72, to the data register A (FIG. 11) in accordance with the Program directions on path 200. However, as will be shown, such information is not extended beyond data register A when the system is in the program entry or verify condition.

MACHINE CYCLE a. Strobe Generator 79

Figure 14:
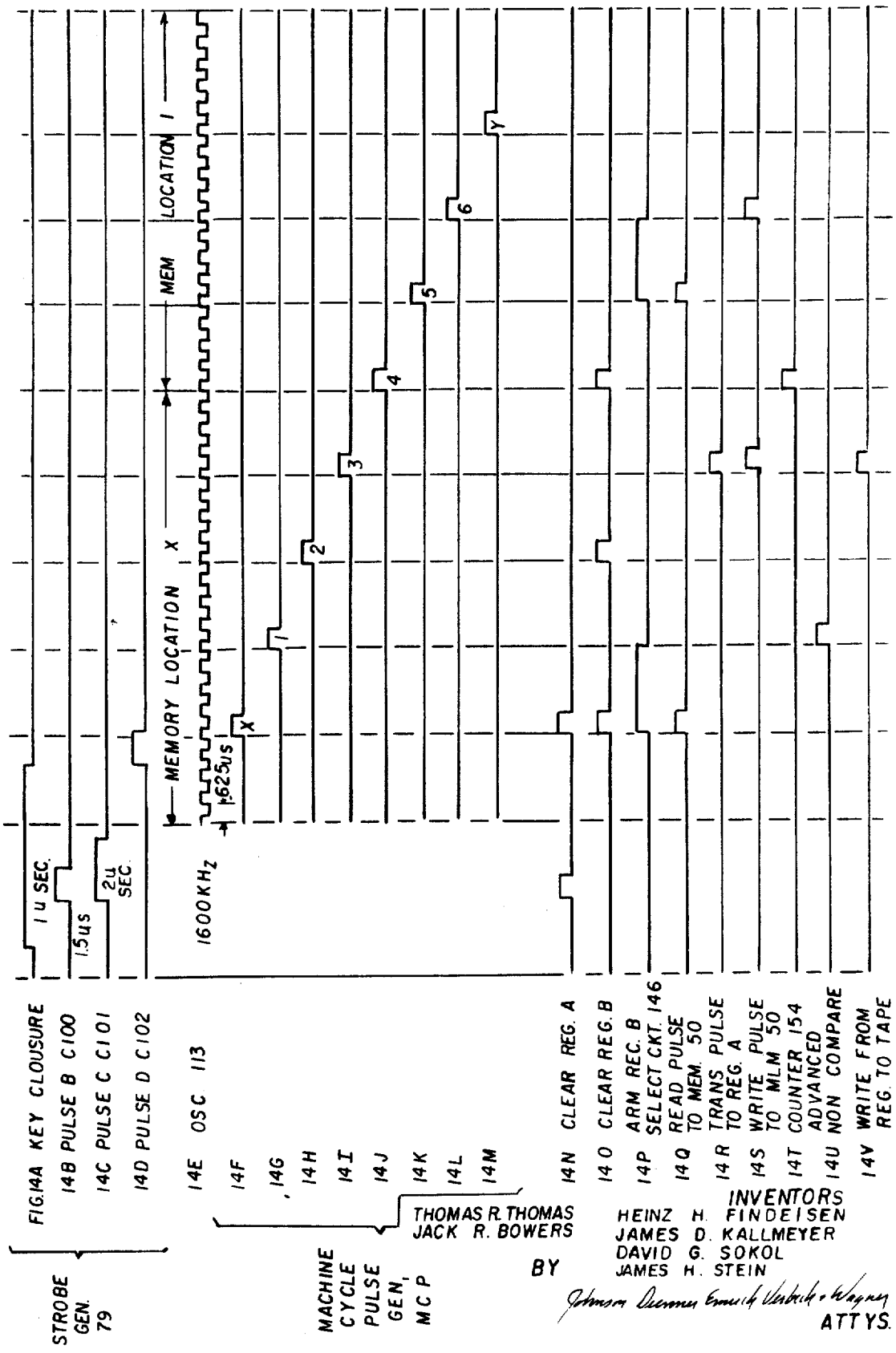
FIGS. 14A–V comprise a graphic showing of the pulses which are generated by and used in the control of the data station circuitry of FIGS. 9–13.

More specifically, with the closure of key 4, J the potential at the junction of diode 79 and resistor 76 increases and such potential over lead 77 and conductor 90 to strobe generator 79 effects generation of a first set of pulses B, C, D to initiate a machine cycle which is best explained by reference to the waveforms 14A-D shown in FIG. 14 in conjunction with the following explanation. In the event that two character keys on keyboard 12 are simultaneously operated, circuit 93 detects the increased voltage and associated logic circuitry provides energizing current for error lamp 20 (FIG. 2).

With reference to FIG. 14A, the pulse which occurs with each closure of a key, such as 4,J, is shown thereat, and the pulses B, C, D, resulting therefrom are shown in FIGS. 14B-D.

More specifically with the closure of a key on keyboard 12 to provide a key pulse over path 90 to strobe generator 79, the leading edge of the key pulse is fed over an inverter 91, and a 1.5 millisecond delay network 92 to fire a 1 $\mu$ second multivibrator 94 which provides a 1 $\mu$ second pulse B (FIG. 14B) over AND gate 100 (FIG. 10) and conductor CL100 to clear the data and program registers A (140, 260—FIG. 11). In addition the key pulse fed over the 1.5 millisecond delay 92 enables a 2 $\mu$ second multivibrator circuit 95 which responsively generates a strobe pulse C (FIG. 14C over gate 101 and conductor C101, for the purpose of strobing the information from the matrix 70 to the A registers (FIG. 11).

At the termination of the key closure pulse (FIG. 14A) the trailing edge of such pulse over inverter 96 (FIG. 10) and inverter 97 and delay 98 enables a further 1 $\mu$ second multivibrator 99 to provide a 1 $\mu$ second start pulse D over conductor C102 (FIG. 14C) to machine cycle pulse generator MCP. The one shot multivibrators 94, 95, 99 may be of the type commercially available as Model Number SN 74121N from Texas Instruments. The gates 100-102 are normally enabled to conduct the output pulses from multivibrators 94, 95, 99 respectively, and are disabled when contacts EC are opened in response to detection of a tape cycle error.

The pulse B output from strobe generator 79 over conductor CL100 is connected as a reset pulse for both data register A and program register A respectively (FIG. 11) for the purpose of clearing out any information which may be stored therein. That is, the program register A (140) and the data register A (260) comprise four and six flip-flop circuits respectively, each of which is connected to represent the bit value (0 or 1) for a corresponding one of four or six of the bits (1, 2, 4, 8, A, B) of the information which is fed thereto from the matrix 70. Thus, the program A register 140 will include four flip-flops which store the information as marked in the program shift section 73 of matrix 70 (FIG. 9) and gated thereto over path 86, strobe gate 106, OR gate 108 and paths 109 and 110. The reset circuits of the four flip-flops are connected common to conductor C101, whereby with each key closure the resultant reset pulse B on conductor C101 will reset the flip-flops to 0,0,0,0 and thereby clear the information from program and data registers A preliminary to storage of the newly keyed information.

The strobe pulse C which is output from strobe generator 79 over conductor C101 to the four AND gates in strobe gate 106 enables the ones of the four gates which are marked via lines P1,P2,P4,P8 in path 86 and the horizontal conductors in the program section 73 of matrix 70. In the present example (key 4,J) only the third AND gate of the group (which has conductor P4 connected to its input) will be enabled responsive to the strobe pulse C over conductor C101. Program Register A will thus have logic 0 on input B1, B2, B8 and logic 1 on input B4.

With reference to FIG. 14B, C once more, it will be apparent that the reset pulse B for register A and the strobe pulse C for entering new information into program A are initially concurrent. However, the strobe pulse C is of longer duration and will therefore result in operation of the flip-flops to mark digit 4 in the program register A as the reset pulse B is ended.

It is also noted that the output of the first AND get in strobe gate 106 is connected over a OR gate 108 to the first flip-flop of the program register A. The second input to OR gate 108 is connected to the output of an automatic program verifier 500 which as will be shown operates to automatically feed logic 0/1 bits to program register A in an automatic verification of program as described hereinafter.

The program register A may comprise two integrated circuits of two flip-flops each, which are commercially available from Texas Instruments under Serial No. SN 7402N.

As the trailing edge of the key closure pulse (FIG. 14A) occurs (i.e., as the operator releases the key 4,J in the present example), the trailing edge of such pulse over conductor 90 (FIG. 9), inverter 96, gate 97, delay network 98 and the one shot multivibrator 99 results in a 1 $\mu$ second pulse D over gate 102 and conductor C102 which starts the machine cycle pulse generator MCP and the generation of a set of clock pulses X, 1-6, Y (see FIGS. 14F-M). As there shown, each of the successive clock pulses is of 0.625 $\mu$s duration with an interval between such pulses of 1,875 $\mu$s.

b. Clock Pulse Generation

With reference to FIG. 10, the pulse D output from strobe generator 79 as the result of closure and release of a character key on keyboard 12 is transmitted over conductor C102 to enable the machine cycle pulse generator MCP. More specifically the pulse on conductor 102 enables flip-flop 112 which enables gate 114 to feed the pulses output from free-running 1,600 H$_z$ oscillator 113 to the input for 32 counter 115. The 0.625 $\mu$ second output pulses from oscillator 113 are shown in FIG. 14E.

Counter 115 advances as successive pulses are received from oscillator 113 and marks each of its Q, Q̄ inputs in conventional manner to indicate the registered count. Pulse logic gates, such as the illustrated gate for clock pulse X, are connected in known manner to provide the output pulses X, 1–6, Y over the conductors illustrated and marked by such designations. The illustrated gate for clock pulse X will be enabled when the counter is advanced by the second input pulse from the start of pulse D. It is apparent that by connecting gate clock X to the conductors shown, a logic 1 pulse is output only when the counter 115 is advanced to such count. The manner of connection of the other gates for clock pulses 1–6, Y will be apparent therefrom and from reference to FIG. 14F–M.

As the counter 115 advances to count 32, the output on 32 conductor over OR gate 114a resets flip-flop 112 to disable gate 114 and terminate the pulses from oscillator 113 to counter 115. The output of gate 114a over conductor 114b also resets counter 115 preparatory to re-use in a subsequent cycle. A second input to OR gate 114a is momentarily completed with each closure of power switch 42.

C. System Response to Clock Pulses

Summarily with closure of any one of the keys on the keyboard 12 with the system in the Program Entry Mode, strobe generator 79 responsively provides pulses B,C,D, to clear Program Register A (140) to effect storage of the information represented by such key in Program Register A, and to effect operation of machine cycle pulse generator MCP to provide the clock pulses $X_1$, 1–6, Y over the correspondingly marked conductors (FIG. 10) to effect a predetermined cycling of the system equipment in a program entry mode.

The first output pulse, CLK X, is fed over OR gate 116 (lower right hand—FIG. 11) to the reset input for the program registers B1, B2 to clear out any of the information which may have been previously stored therein. Program Register B1, which may be identical to program register A, comprises four flip-flops for storing the bit information 1, 2, 4, 8 as fed thereto. Program Register B2 is a duplicate of Register B1, and is reset with Program 1 by clock pulse X.

Clock pulse X is also fed over gate 166 to the read input for the program portion of memory 50 to effect readout of the information in the cores assigned to Column 1 in the Program 1 memory. As will be shown in a separate description of the memory, with the system in the Column 1 position during program entry, the cores associated with Column 1 for Programs 1 and 2 are selected by the system so that as a read pulse, such as clock pulse X, is received over gate 166, the information stored in such cores for programs 1 and 2 is fed over the paths 122 and 124 respectively, and the information stored in the data cores for Column 1 is read out over path 277.

Figure 15:
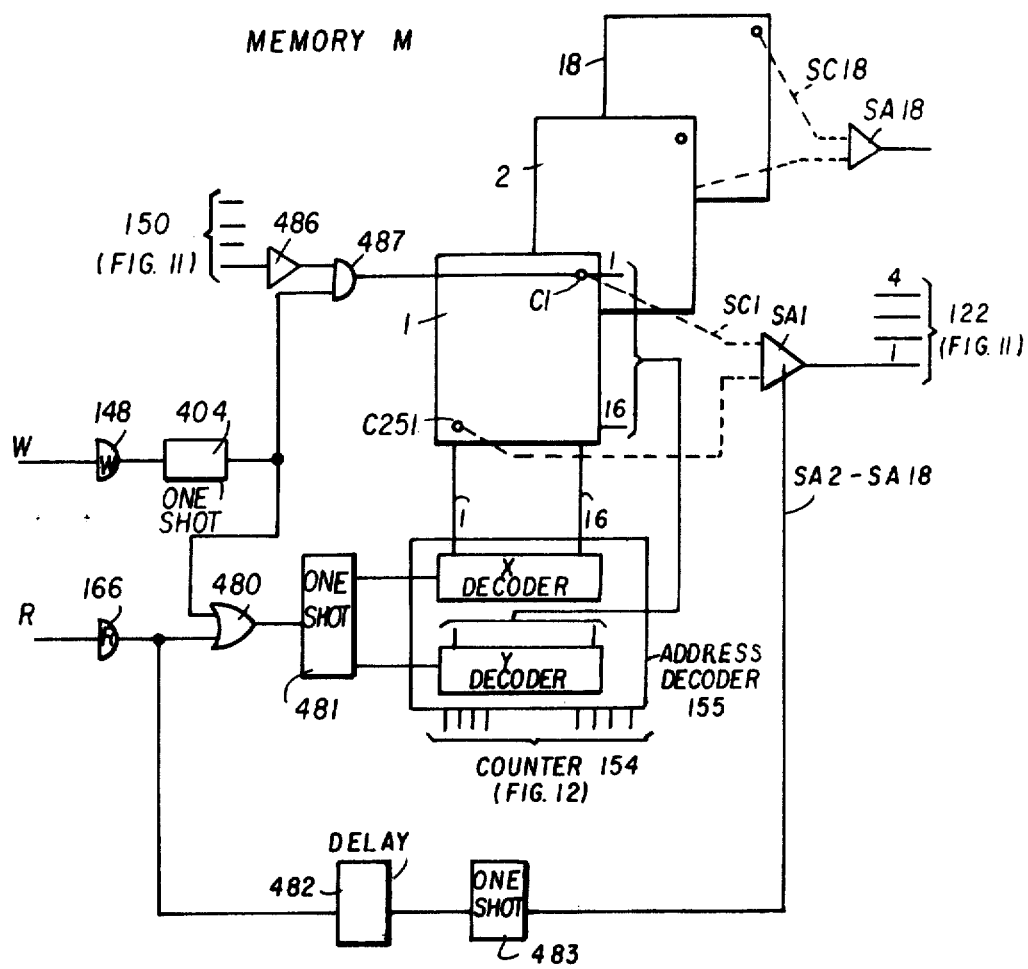
FIG. 15 is a schematic view of the memory which is used in the data station system.

Digressing briefly, the memory 50 is shown in more detail in FIG. 15. As there shown the memory M is comprised of 18 planes 1–18 of cores, each plane having 256 cores (16 rows of 16 cores each), whereby 18 bits of information can be stored for each of 256 different columns. Assuming that the illustrated cores of each core plane 1–18 are to be designated core 1 in memory for Columns 1–18, it will be apparent that core C1 in the first plane can be assigned to store the first bit of the program information for such column, the corresponding core in plane 2 may store the second bit for such column, etc. Thus core 1 in the first four planes may be connected to store the four bit word for Program 1 in Column 1; core 1 in the next four planes 5–8 may be connected to store the four bit word for program 2 of column 1; core 1 in the next six planes 9–15 may be used to store the six bits of data information for column 1, and the corresponding core 1 in the last four planes is used for purposes not of import to this disclosure.

Selection of the 18 cores which store the information for a column, such as Column 1 of Program 1, is effected by counter 154 (FIG. 12) which provides an output in binary marking via the eight conductors in path 154' to address decoder 155. When counter 154 advances to its first position the X, Y decoders in address decoder 155 operate in known manner to mark the 16 horizontal rows of conductors input to each of the eighteen planes with the markings in binary code which represent the column selected by the counter 154. In the present example, Column 1 is being selected so a 1/2 current marking is placed on the first horizontal conductor to select the first horizontal row of cores in each plane. In a similar manner, the X decoder is operative to mark the vertical row which contains core 1 in each plane with 1/2 current. Since only core 1 in each plane will have 1/2 and 1/2 current marking (X, Y), only core 1 of the planes will be selected.

Readout of the information in memory is achieved with selection of a core, such as core 1, by the X, Y decoders (whereby 1 unit of current is applied to the selected cores in a direction opposite to the X,Y current). More specifically, as a read pulse is input over read gate 166 (FIGS. 15 and 11) such pulse over OR gate 480 to one shot 481 enables the X, Y decoders in address decoder 155 to select the core in each plane for the particular column which is indicated by counter 154 (Column 1 in the present example). The same pulse output from read gate 166 over delay circuit 482 and one shot 483 strobes the sense amplifier SA1, SA18 for each plane. Since the readout current of 1 unit is applied in a direction opposite to the X, Y current, if core 1 in plane 1 has logic 1 stored therein, such bit will be destroyed, and the resultent pulse on the sense conductor SC1 (which is threaded through each core in plane 1) will be input to sense amplifier 1, and as amplifier will be fed a logic 1 output over conductor 1 in path 122 to the Program B Register. Core 1 in each of the other planes will be readout in like manner by sense conductors SC1–SC1S and sense amplifiers SA2–SA18. If a logic 0 is stored in a core, there will of course be no output.

Writing of information into core storage is effected by application of a pulse over write conductor W. As shown in FIG. 15, the data input conductor for core 1 in plane 1 is connected over inverter 486 and AND gate 487. A second input of AND gate 486 is connected to the inhibit output of the write circuit. That is, the write pulse input over write gate 148 (FIGS. 11 and 15) on CLK pulses 3, 6, is fed over one shot circuit 484 to inhibit input 485 of gates, such as 487, for the data paths such as 150 input into the memory M. The same pulse output from one shot 484 via OR gate 480 operates one shot 481 to enable the X, Y decoder in the selection of the cores for the column indicated by counter 154 (assumed to be column 1 in the present example).

If the data input signal over conductor 1 of path 150 is logic 1, such signal at the output of inverter 486 will be logic 0 and as fed to core 1 on plane 1 will not inhibit such core. As a result the 1 unit of current provided by the X, Y inputs effects the storage of logic 1 in the core. Alternatively, if logic 0 is input over such path, the output of inverter 482 will be 1, and core 1 will be inhibited to effect storage of logic 0 in core 1.

The manner in which information is written into memory 50, and is read out of memory 50 in the different operations to be described will be apparent from the foregoing description.

Returning once more to the machine cycle, and the generation of pulse CLK X by the generator MCP (FIG. 10), as pulse CLK X is applied over gate 166, it will be apparent from the foregoing description that the information is read out of the cores for Column 1 of Program 1 and Program 2 over the four conductor paths 122, 124 to Program Select circuits 142, 146 respectively. Although the system is in Program 1 Enter condition, the information in the cores in memory for Column 1 of both Programs is fed to the corresponding flip-flops in both Program Registers B1 and B2.

Digressing once more slightly, the particular program register 128a, 128b which will be used in a Program Entry or Program Verification operation is determined by the signal input to the program select gates 141, (i.e., over Program 1 or Program 2 conductors) which is determined by the position of program switch 133 which is operated by the program key on keyboard 12 and the position of the Program Data switch 46 and the Enter, Verify switch 47. Assuming program switch 133 is in the illustrated position the Program 1 input is marked and Program Select Gates 141 mark output conductors 137, 138 with logic 1 to prepare one input for gate 144 in the Program 1 select circuit 142 and one input for gate 149 in the reset circuit for Program Register B1.

As pulse CLK X-1 is input to gate 143 of the program select circuit 142, gate circuit 143 (which symbology represents four gates as explained heretofore) extends the markings which represent the information stored in Column 1 of Program 1 over OR gate circuit 145 (also four gates) to the flip-flops in Program Register 1 which operate to register such information therein.

It is apparent that as pulse CLK X-1 is input to Program 2 select circuit 146, corresponding gates therein would extend the markings on path 124 from the four cores for Column 1, Program 2 to Register B2.

Returning now to the machine cycle, CLK pulse 1 as generated is not of significance in the present operational mode. As pulse CLK 2 is output from pulse generator MCP (FIG. 10) during the Program Enter Mode (i.e., the Data-Program switch 46 in the Program position and the Enter-Verify Switch 47 in the Enter position), such pulse to gate 147 (FIG. 11) enables gate 148 to provide a reset pulse over conductor 132 to program registers B1, B2 to reset the flip-flops in such register and thereby destroy the information which was stored therein. Thus, in effect, any information which was stored in the memory cores for Column 1 of Program 1 as the key 4 was depressed for program entry purposes has been removed from the cores in the memory, placed in the Program Register B1, and by reason of the reset pulse over gate 147 at pulse CLK 2 has been destroyed.

As the pulse CLK 3 output from pulse generator MCP is fed during the Program Entry mode (Program-Data switch 46 in the Program position, and Enter Verify Switch 47 in the Enter position) to gate 139 (FIG. 11) the information in Program Register A (140) is gated over the gate circuit 139 (four AND gates), AND gate 144 and OR gate 145 in Program Select Circuit 142 to the flip-flops in Program Register B1 for storage thereon.

Pulse CLK 3 after a fractional μ-second delay introduced by delay circuit 146', enables write gate 148 to provide a write pulse for memory 50 which causes the bit information registered on the flip-flops in the Program Register B1 to be transferred over the four conductors 150 for storage in the memory cores which are assigned to store the information for Column 1 in Program 1. It will be apparent that a similar transfer occurs over path 151 to Column 1, Program 2 in memory which is without significance at this time.

As pulse CLK 4 of the machine cycle is generated, the processing of the keyed character 4 is in effect terminated, and the system is advanced to the Column 2 to prepare the system for the entry of a further information bit by the operator. That is, as the pulse CLK 4 is output from pulse generator MCP (FIG. 10) to gate 116 (FIG. 11) the program register B1 is cleared in preparation for the receipt of the further information bit.

In addition, pulse CLK 4 is fed over gate 152 (FIG. 12) to memory counter 154 (FIG. 12) to advance the counter one step, and thereby enable address decoder 155 to select the second vertical column of cores in memory 50 for use in the processing of the next information bit input to the system over keyboard 12. It will be apparent therefrom that with each keystroke a set of information is entered into one column of the core memory 50, and a further column in memory is selected in preparation for the next key stroke.

Memory counter 154 may be a conventional up-down counter, such as the unit commercially available from Texas Instruments under Model No. SN 74193N which advances or decreases its count with each pulse input thereto over the up/down inputs respectively. The display address BCD decoder 160 may be of the type commercially available from Texas Instruments as Model No. SN 7441N. The BCD decoder 160 is connected to the address lines output from counter 154 to provide enabling signals for the column lamps 1-120 in display sector 26 of console 14 (FIG. 3) in accordance with the count registered on the counter 154. In the present example, the BCD decoder 160 decodes the output of the counter 154 and marks the digit 2 output to lamp 2 in row B of the display section 26.

As the next clock pulse CLK 5 is output from generator MCP (FIG. 10) the program select circuits 142, 146 (FIG. 11) are clocked by such pulse. Although Program 1 has been selected as described above, both select circuits 142 and 146 alone will gate the information input from the cores for Column 2, Program 1 in memory 50 over conductors 122 and 124 and to Program Registers B1 and B2 for storage therein. Such core readout is effected by pulse CLK 5 input over read gate 166 to memory 50. While this part of the cycle is without function at this time, such readout is essential during other modes of operation as will be shown.

The generator MCP (FIG. 10) now provides pulse CLK 6 of the cycle to OR gate 148 (FIG. 11) and write conductor W to write the information which is in Program Registers B1 and B2 over paths 150 and 151 back into the cores for column 2 of both Programs in memory 50. Again while such operation is not of import in this particular cycle, it is essential during the other modes to be described.

The machine cycle output of pulse generator MCP is terminated with the clock pulse CLK Y which effects an operation which is not of import during the program entry mode.

With each successive keystroke by the operator, information is entered into memory for Program 1 in the manner described. The operator in the entry of the information shown in the example of FIG. 4 continues the entry by operating the space bar (numeric field) for Columns 2-5, the character key 4 for column 6, the space bar for Columns 7-9, etc., until the information indicated for Program 1 on the card has been entered into the first 80 columns of memory 50.

The program as entered will remain in core storage until changed by a further program entry. If an error is made during program entry, it can be corrected by backspacing to the column in which the error occurred and striking the desired key.

At the end of the entry of the information for Program 1, the operator operates the ER-HOM keys to reset the system to Column 1. At this time an alternate program can be entered (i.e., Program 2) or the program can be verified.

d. Program Verification

The novel system permits verification of each program in a new, more expeditious manner. During verification, the characters are keyed by the operator, but are not entered into the program memory as during program entry. Instead, the keyed characters are compared to the program information in the program section of memory 50. According to the invention, in verifying a program, it is only necessary to key out the digit in the most significant position of a field (the MSP) and the novel circuitry will effect automatic verification of the other columns. That is, with the exception of the MSP's all remaining field columns will normally contain spaces and 1's (as for example, the date field having a number 4 in the MSP is followed by four spaces . . . the name field having number 3 in the MSP is followed by 1's). The circuitry upon detecting the particular field to be verified by means of the MSP will automatically verify the remaining columns of a field at a machine speed of 20 microseconds per column.

If an error is found during program verify, automatic verification will be terminated and the error can be corrected by merely operating the Enter-Verify switch 47 to the Enter position which permits the operator to correct the error by depressing the proper key. After error correction, the Enter-Verify switch 47 is returned to the Verify position so that verification may continue.

Any error, as located, will result in the energization of the red flashing error light 20 (FIG. 2) and the keyboard 12 will be automatically locked out.

With reference now to the console panel 14 shown in FIG. 3, and assuming the operator has keyed the ER-HOM keys to set the system at Column 1, the system is now switched to the verification mode by setting the mode selection switches 46 to the Program position, the switch 47 to the Verify position and the switch 48 to the Off position. In the event no program selection is made the system will remain in Program 1. Further, the system having returned to Column 1 the BCD decoder 160 (FIG. 12) will illuminate the Column 1 lamp of display area 26 and since the digit 4 was entered into Column 1 during the program entry mode, the program information via Program Register B1 will illuminate the 4 DUP lamp of display 29.

Assuming the operator intends to verify the program shown in FIG. 4 which has just been entered, he now keys the most significant digit for the first field (i.e., digit 4 in the present example) and the machine will automatically check the MSP and the successive digits of that field (Columns 1-5). If a number other than 4 had inadvertently been entered in column 1, or a character other than a space had been entered in colur as 2-5, the equipment will automatically lock out the keyboard and flash the red error light 20 (FIG. 2). If the operator correctly entered number 4 in the first column followed by four spaces in columns 2-5 during entry, and now correctly keys digit 4 for column 1 verification, the system will automatically advance to column 6 and await the further keying of the MSP for the department field which, as shown in FIG. 4, is again digit 4.

It is apparent that in the verification of the program shown in FIG. 4, the operator need only key 10 characters to verify the 80 entries which have been made for program 1. The obvious saving in time in the verification of the programs will be apparent to those skilled in the art, and such arrangement is considered to constitute an important feature of the present invention.

SPECIFIC DESCRIPTION OF PROGRAM VERIFICATION

With reference once more to FIGS. 9-13, it is assumed for description purposes that Program 1 shown on the card in FIG. 4 has been entered in memory 50, and that the ER-HOM key was operated to initiate a readout cycle which causes the memory counter 154 (FIG. 12) to move to the first column or position, and to illuminate Column 1 lamp in the indicator portion 26 on the console 14. In addition, the system will also illuminate the Program 1-Verify lamps in section 32 (FIG. 3), and the 4 Dup. lamps in section 29.

Briefly, as the ER-HOM keys on keyboard 12 are operated preparatory to program verification, the system operates in the manner previously described to initiate a machine cycle, wherein clock pulses X, 1-6, Y are generated and as counter 154 (FIG. 12) is enabled by the pulse CLK 4, it is effective to reset the system to position 1 and enable address decoder 155 (FIG. 11) to select Column 1 in memory 50. As pulse CLK 5 is fed to Select Circuit 142 (FIG. 11) for Program Register 1, gate circuit 143 is enabled to extend the four bits stored in the cores of Column 1, Program 1, in the memory 50 over four conductor path 122 and gate circuit 143 and OR gate 145 in program 1 select circuit 142 and the four conductor path 126 to the four flip-flops in program register B1. With the digit 4 registered in the program register B1, four bits are fed over the four conductor path Q1 to program output select circuit 161 which comprises a series of gates for selectively forwarding the information stored in program register B1 or B2 depending upon the mode selected by the operator. That is, with the selection of Program 1 by the keyboard switch 133 (FIG. 11) a logic 1 on conductor P1 enables gate 161a (the power switch 42 was turned on when the machine was put into use) which enables gate circuit 162a (four AND gates arranged in the manner of strobe gate 106) to conduct the information representing digit 4 (which is the BIT 4 line only active over OR gate 163, and the four conductor path 164a to a BCD decoder 165, whereby the one of the seven output conductors 1-7 in cable 166a which represents the digit 4 is marked to enable one input lead for lamp gate 168 (FIG. 13), Decoder 165 may be of the type commercially available from Texas Instruments under Serial No. SN 7442N.

As the clock pulse CLK 6 of the ER-HOM cycle is output from machine pulse generator MCP (FIG. 10) the inhibit flip-flop 169 (FIG. 13) is reset to provide a pulse over conductor 170 to the second input on each of the logic gates, such as 168, for the "2-7" lamps. Gate 168 which was marked by the signal output over the digit 4 conductor in path 166 as the result of the bit information in Program Register 1 will be enabled to provide (a) the set input for the Dup. flip-flop 172 and (b) an energizing potential over cable 198 for lamp 4 of the code lights in section 29 of display console. Dup. flip-flop 172 sets to extend potential over conductor 174 in cable 175 to complete an energizing circuit for the Dup. lamp on display area 29 of display board 14.

Figure 12:
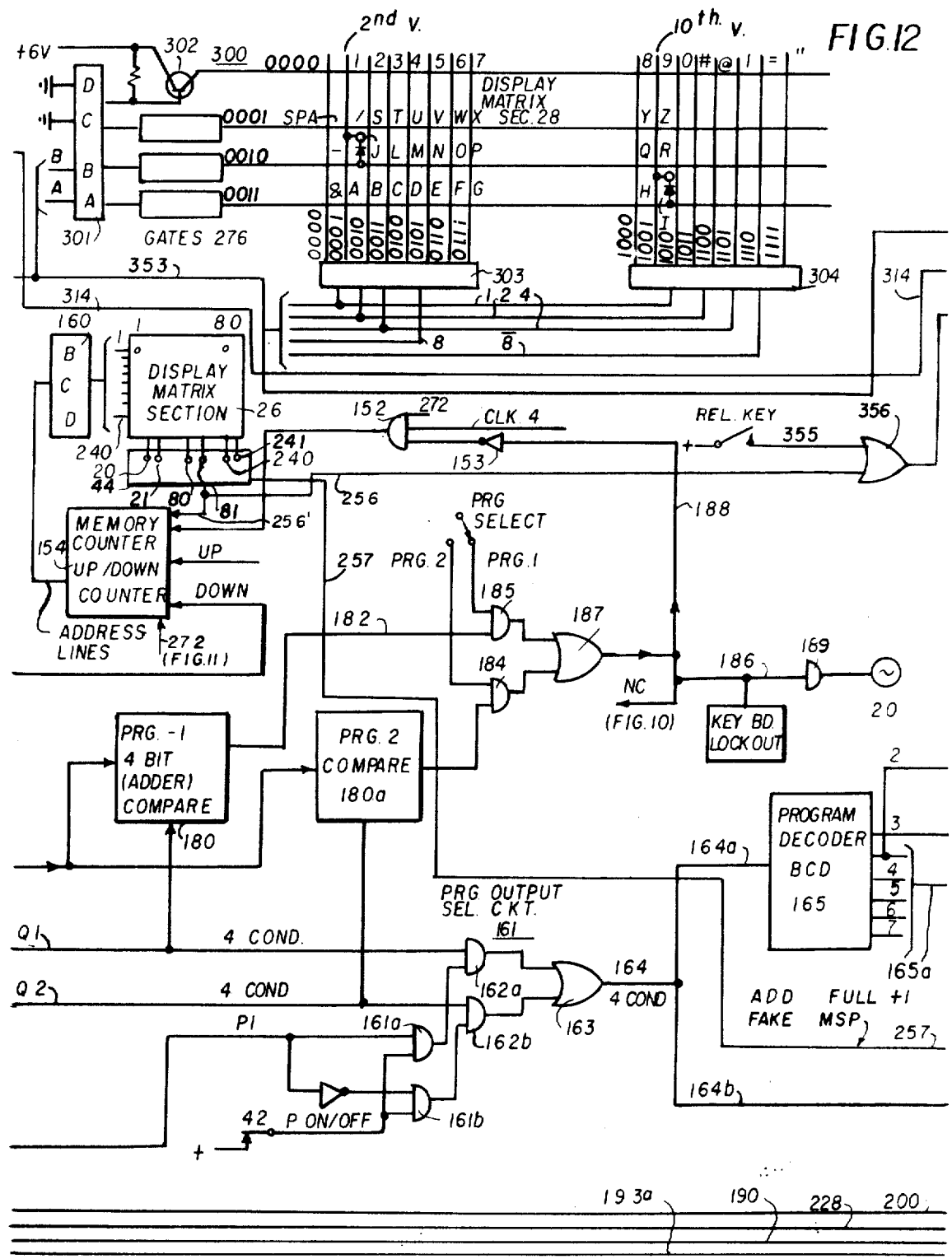

Pulse CLK 6 of the ER-HOME cycle also prepares the automatic verification circuit 500 (FIG. 10) for operation. That is, as the pulse CLK 4 of the ER-HOME cycle effected readout of digit 4 from Column 1, Program 1 to the Program Register B, and such information as registered in Program Register B was gated by program output select circuit 161 over path 164a for the lamp display, the same output from gate 163 (FIG. 12) is also extended over path 164b and an OR gate 188 and conductor 190 to AND gate 202 (FIG. 10) in the automatic verification circuit 500. As pulse CLK 6 of the ER-HOME cycle now enables the second input for gate 202 the output signal from gate 202 sets the MSPM flip-flop 204 which in turn at its output sets MSP flip-flop 206 which enables one input for AND gate 217. As pulse CLK 6 is applied to the second input of AND gate 217, the output signal from such gate sets field flip-flop 216. Pulse CLK Y over AND gate 210 thereafter resets the MSP flip-flop. CLK Y via gate 193 (FIG. 13) also resets all the flip-flops except Dup. flip-flop 172 which is held set by the decoded program code output from decoder 165 (FIG. 12).

In verifying the card shown in FIG. 4, the operator depresses key 4 which in the manner described earlier results in the marking of the sections 71-73 of matrix 70 with the codes for 4,J (FIG. 9). With reference to the program shift section 73, the vertical conductor 4 which is marked as key 4,J as operated is extended over lead P4 in cable 86 to one input of the associated gate B4 in strobe gate circuit 106. The closure of key 4,J also results in a pulse over diode 79 (FIG. 9) and path 90 to strobe generator 79 which operates in the manner described above to provide pulses B,C,D, over conductors CL100, C101, C102 to effect system preparation including enablement of the machine cycle pulse generator MCP in the generation of pulses X, 1-6 Y in the manner described heretofore.

The pulse B output from strobe generator 79 (FIG. 10) over conductor CL100 and C101 provides a reset pulse for the flip-flops of Program Register A (FIG. 11) to clear the Program A Register (140) for registration thereon, and pulse C via conductor C101 strobes the gates 1, 2, 4, 8 of strobe gate 106 to transfer the digit 4, which has been marked on program matrix 73, over path 110 to the Program Register A for registration thereon.

As the key 4, J is released by the operator, the pulse D output over conductor C102 from strobe generator 79 enables Machine Cycle Pulse Generator MCP to put out clock pulses CLK X, 106, Y in a pattern which results in the comparison of the digit entered into the system by the operation of the key 4,J on keyboard 12 with the digit which was stored during program entry in Column 1, Program 1 of memory 50. In the event of verification, the system advances to Column 2 of Program 1 and automatically verifies the remaining columns in the field (Col. 2-5 in the present example).

More specifically, clock pulse X of the "4,J" cycle as fed over OR gate 116 (FIG. 11) to the reset input of Program Register B1 clears Register B1, and the same pulse CLK X to the set conductor of inhibit flip-flop 169 (FIG. 13) results in an output pulse over path 170 which inhibits the letter-number flip-flop 178, and also inhibits the group of lamp gates LG, 167, which controls the MSP code lights 2-7, and the gates C194, 195, 196, 197, 308 which control the flip-flops such as DUP 172, Skip 173, etc. As flip-flop 169 is set gate 168 is disabled. However, Dup. flip-flop 172 remains set and the 4 Dup. lamp remains illuminated. Pulse CLK X of the "4, J" cycle as applied to gate 166 (FIG. 11) and the read conductor R for memory 50 effects readout of the bit information (digit 4 in the present example) which is stored in the cores of Column 1, Program 1 over path 122 and gates 143, 145 in program select circuit 142 to program register B1.

With digit 4 registered in Program Register B1, the register B1 provides the same bit information over the four conductor path $Q_1$ output therefrom to compare circuit 180. The bit information for digit 4 as placed in Program Register A in response to the key stroke "4, J" and pulse C of the generator MCP appears over path $\overline{Q}$ at the second input of compare circuit 180 (FIG. 12). The compare circuit 180 may be a four bit adder circuit of the type which is commercially available from Texas Instruments under Serial No. SN7483N, and is operative in the event of a comparison of the four bits input over $Q_1$ and $\overline{Q}$ respectively to provide a logic 0 signal output over path 182 and gate 185 and OR gate 187 to the NC conductor 188 and automatic verification circuit 500 (FIG. 10) to prepare such circuit for automatic verification.

Digressing briefly, in the event of a non-compare, a logic 1 output from compare circuit 180 is extended over conductor 182, gates 185, 187 and conductor 186 to the noncompare circuit 189 which provides an output potential signal to illuminate the flashing error lamp 20 on the keyboard 12 and to the keyboard lockout circuit.

In addition, the logic 1 output signal resulting from a non-compare message is fed over conductor 188 to gate 152 via inverter 153 to disable gate 152 and thereby prevent advance of the memory counter 154 by pulse CLK 4 from the machine cycle pulse generator MCP as it occurs later in the 4,J cycle.

It is assumed in the present example that the comparison of the digit 4 entered by the generator for verification, and the digit 4 stored in Column 1, Program 1 did compare, and as a result a logic 0 appears over conductor 188 and as inverted by inverter 153 appears as a logic 1 at one input of gate 152. The same signal appears as a logic 0 signal on NC conductor to gate 220 of the automatic verification circuit 500 (FIG. 10). Accordingly, pulse CLK 1 as applied to the second input for AND gate 220 will be without effect. Accordingly, the field flip-flop 216 remains in the set condition and provides a logic 1 signal to AND gate 220'. The ONES flip-flop is reset (i.e., it is only set when the program decoder 165 (FIG. 12) detects digit 3 registered in the program register B1 and marks input conductor 228 with logic 1). With ONES flip-flop reset, the Q output is logic 0 to AND gate 220'. With logic 1 and logic 0 on the two inputs, AND gate has logic 0 output over OR gate 108 and conductor 109 to the program register A. With logic 0 on conductor 109 and logic 0 on the three conductors of path 110, Register A provides a space indicator at its output. It is apparent that if a digit 3 had been detected by the program decoder 165 and the conductor 228 would have been marked to set the ONES flip-flop 218 to provide logic 1 output to gate 220'. With logic 1 on both inputs the output of AND gate 220' is logic 1 and a "one" would be loaded in Register A.

As pulse CLK 3 of the "4,J" cycle occurs, the digit 4 in Program Register B1 (FIG. 11) is written back into memory 50, the pulse CLK 3 being applied to gate 148 and the Write conductor as described heretofore to effect such entry of information into the Column 1, Program 1 cores.

Pulse CLK 4 as applied over gate 116 (FIG. 11) as described earlier resets Program Register B1, and simultaneously such pulse applied to counter 154 (FIG. 12) advances the counter to its next count which in turn controls address decoder circuit 155 to select Column 2, Program 1. Pulse CLK 4 also resets MSPM flip-flop 204 (FIG. 10) in the automatic verification circuit 500. However, field flip-flop 216 remains in its set state, and flip-flops 216, 218 continue to provide a "zero" output to Program Register A.

As pulse CLK 5 of the "4, J" cycle occurs, the read pulse over read gate 166 (FIG. 11) effects readout of the information in Column 2, Program 1 in Program Register B1 as heretofore described, and at pulse CLK 6 as applied to Write gate 148 effects writing of the information in Program Register B1 into memory 50 without destroying such registration in Program Register B1.

Pulse CLK 6 also attempts to set the MSPM flip-flop 204 (FIG. 10) in the automatic verification circuit 500. However, the system has now shifted to the next column (Col. 2) and there is no MSP in such column i.e., there is a space). Accordingly conductor 190 is marked with logic 0 and flip-flops 204, 206 remain reset. Logic 0 to gate 210 prevents CLK Y from resetting flip-flops 216, 218.

The CLK 6 input to AND gate 217 is enabled by the second input to 217 from MSP 206 only when an MSP is present, therefore is without effect in Column 2 of the present example. However, field flip-flop 216 remains set from the MSP of Column 1, so that logic 1 over conductor 230 to the cycle pulse generator MCP initiates another cycle of the pulse generator MCP in the same manner as it the operator had keyed the space bar in the keyboard for verification of the information in Column 2.

Figure 13:
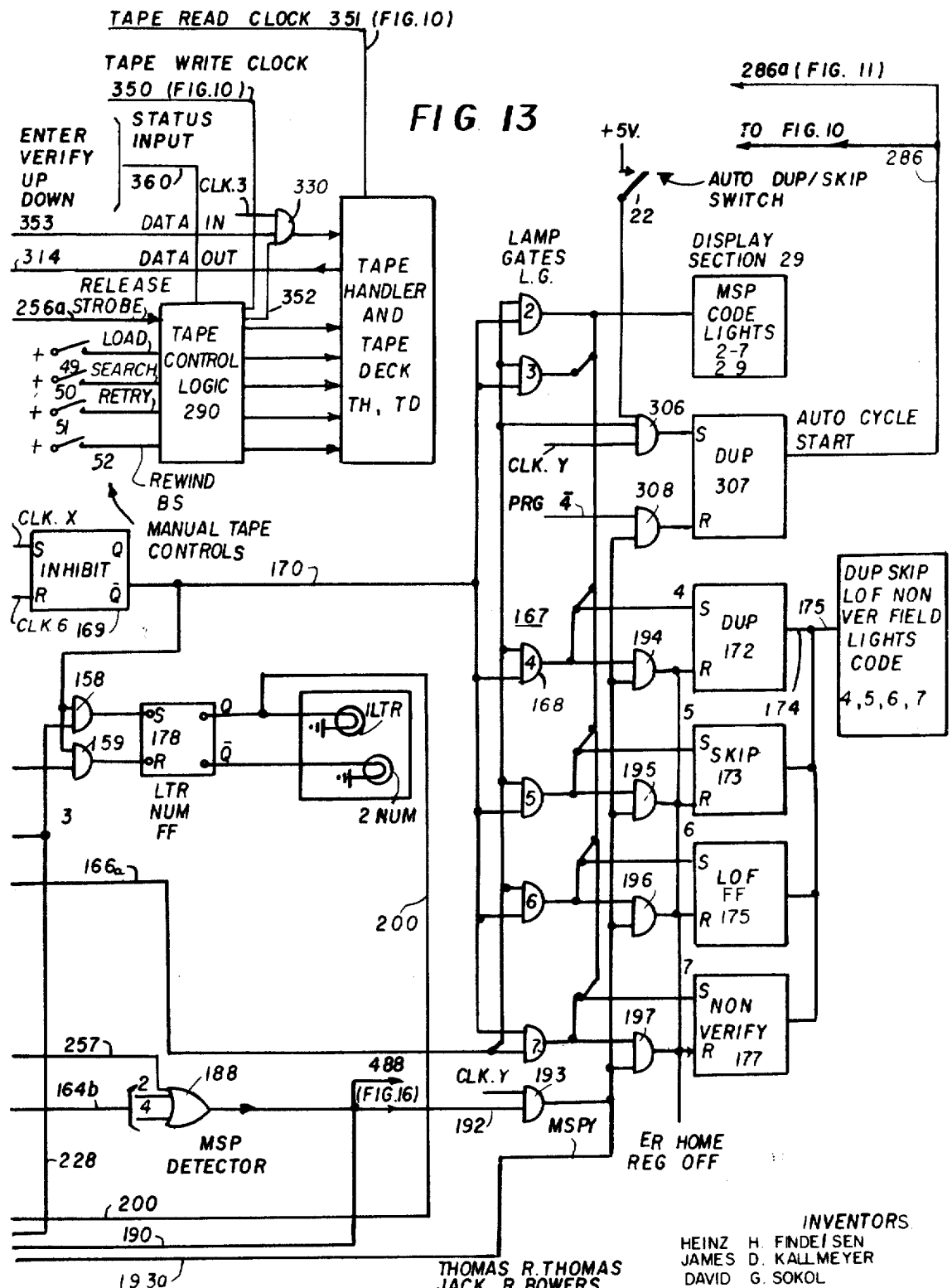

At this time, the output of BCD decoder 160 (FIG. 12) provides an energizing potential for Column 2 in display section 26 and the 4 Dup. legend in display section 29 remains energized. Dup. flip-flop 172 will not reset until the next MSP and clock Y is received via AND gate 193 (FIG. 13).

With the start of the new cycle by the pulse output from the automatic verification circuit 500 to the cycle pulse generator MCP, the pulses X, 1–6, Y provide a further cycle (identified herein as "Space 1" cycle) similar to that described. That is, with a space in Program Register 1 as the result of the readout of Column 2, Program 1 during CLK 5 of the previous cycle and a space in Program Register A from the previous cycle, the two inputs to the comparison circuit 180 compare and the conductor NC will have logic 0 marked thereon. At CLK 1, therefore, gate 220 (FIG. 10) will remain off as an indication to the automatic verification circuit 500 that the zero filled in Program Register A compares with the zero placed in Program Register B1 by CLK X, and that the "Space 1" cycle is to continue.

At pulse CLK 3 to Write gate 148 the information in Program Register B is read back over the path 150 into the memory cores for Column 2, Program 1 and at pulse CLK 4, the counter 154 (FIG. 12) advances the system to Column 3, and would reset flip-flop MSPM in the automatic verification circuit 500; however, the flip-flop MSPM was reset furing the Column 2 operation to permit examination of the digit stored in Column 3. If an MSP is detected, the automatic verification must be terminated. Examination of such MSP is made when pulse CLK 5 is applied to gate 166 to read the 37 space" information stored in Column 3, Program 1 over path 122 and Program Select Circuit 142 to Program Register 1. Such information, as explained previously, is fed to Program Output Select circuit 161 and the MSP detector circuit 188. However, with a space in Column 3 the MSP detector conductor 190 will not be marked and flip-flop MSPM remains reset as CLK 6 is applied to gate 202 in an examination to determine if the automatic verification should be terminated. Automatic filling by circuit 500 continues in this manner until the next MSP is detected in one of the program columns. With reference to FIG. 4, it will be apparent that with the advancement of the counter 154 to select Column 6 of Program 1 and the reading of such information into Program Register B1 at pulse CLK 5 of the "-space 4∞ cycle, the MSP detector circuit 188 will detect the digit 4 which is registered in program register B1. With the detection of the digit 4 by MSP detection circuit 188 (FIG. 12) in program register B1, the resulting logic 1 signal on path 190 to AND gate 202 will, with the receipt of the cycle pulse 6 over conductor CLK 6 during the cycle initiated by reason of the automatic verification of Column 4, provide an enabling pulse over AND gate 202 to the set terminal of the MSPM flip-flop 204, which sets and at its output 205 provides a logic 1 output to one input of AND gate 210. As the pulse CLK Y in the same cycle occurs and is applied to the second input of AND gate 210, a reset pulse is output over OR gate 221 to the reset input for the MSP flip-flop 206, Field FF 216, and ONES F.F. 218.

The reset of flip-flop 216 places logic 0 on the start conductor 230 to the cycle pulse generator MCP to terminate the automatic cycling thereof. Since no further enabling pulses are output to the generator MCP by the automatic program verifier circuit 500, the system will stop as the CLK Y of such cycle occurs and with column 6 in display section 26 lit and the legend 4 DUP in section 29 illuminated. (The BCD decoder 160 detects the position of counter 154 and enables horizontal and vertical elements of display matrix 26 such that position 5 is displayed by the position 5 lamp of display matrix 26. The Prog. Reg. B1 (FIG. 11) over path Q1 program output select circuit 161 (FIG. 12) and program decoder 165 enables gate 168 (FIG. 13) to energize Dup. flip-flop 172 and illuminate lamp 4 of the code light group). Verification of digit 4 must now be manually effected by depression of key 4 on the keyboard 12 by the operator.

The verification of Program 1 continues in this manner with the operator keying in only the MSPs which appear in Columns 1, 6, 10, 16, etc., as the system advances to such columns and stops. The automatic program field verifier circuit 500 effects automatic verification of the spaces or ones which appear after the MSPs in each of the fields.

It will be noted in the present example that the MSP for the NAME field (Col. 70) Program 2 is digit 3; the subsequent columns 71–80 in the NAME field have a digit 1. During verification of the information in the preceding column 69, with the occurrence of pulse CLK 4 in the machine cycle, the system advances to column 70, and during pulse CLK 5 of the same cycle, the digit 3 in memory for such column is read into program register B1. The program decoder 165 marks conductor 3 output therefrom (conductor 228) which sets the "ONES" flip-flop 218 in the automatic program field verifier circuit 500 in the manner described above. With the output of flip-flop 218 a logic 1 and the output of field flip-flop 216 a logic 1, the output of AND gate 220' will provide logic 1 OVER GATE 108 TO THE PROGRAM REGISTER A and for verification purposes. The program decoder 165 also provides a further output to the gate 158 to set the flip-flop 178 and thereby light the letter lamp LTR and deliver LTR shift information as a "1" on line 200 to encoding matrix for the when in the "Data" mode of operation. In addition, the signal output from decoder 165 over conductor 166a operates gate 3 of the Lap Gates LG to light lamp 3 in display section 29.

NON-COMPARE DURING AUTOMATIC VERIFICATION

In the event that during the automatic verification process, the program compare circuit 180 determines that the character keyed into the system by the automatic verifier circuit 500 and the character stored in a column of Program 1 do not coincide, logic 1 output over the conductor 182 and gates 185, 187 and the NC lead to the automatic verifier circuit 500 will be effective as the cycle advances to pulse CLK 1 to enable AND gate 220 to provide logic 1 over gate 221 to the reset terminals of the flip-flop 206, 216, 218. With field flip-flop 216 reset, the enabling pulse for effecting further automatic advancement of the system is terminated. In addition as the machine cycle which is in effect advances to the cycle 4 pulse, gate 152 is inhibited by the signal on conductor 188 to prevent advancement of the memory counter 154, and thereby maintain the system in the position at which the non-verification condition was detected. The Machine Cycle Pulse Generator MCP continues such cycle through pulse CLK Y without further effect other than to restore information to memory which was cleared in the read process.

CORRECTION OF ERROR IN PROGRAM

If an error (NC) is found during program verification and the machine stops by reason of the enablement of the non-compare select conductor 188, the operator must place the mode switches to the program enter position (switch 46 up, switch 47 up, switch 48 up). The operator now depresses the proper key on the board to correct the entry in the program, such entry being made by the system in the manner described under the entry mode. After error correction, the enter-verify switch 47 is returned to the verify position so that program verification can continue. During program entry and verification, the manual and automatic release and tape write and read functions are inhibited, so it is apparent that the correction to the program is in effect made in the memory prior to entering of data or transfer of data to the tape.

In the verification described above, the machine operates to effect such verification automatically, the only exception being when a 2, 4, 5, 6 or 7 MSP is followed by one code, or a 3 MSP is followed by a space code. In fields of this type, the position must be key verified by the operator. Both Skip and Dup if so programmed are not effective during program entry or verification.

DATE ENTRY

In entering data, the system is set up for operation in the data entry mode by operating the mode switches 46, 47, 48 to the data, enter and off positions respectively (FIG. 5A). It was assumed in the present example that the operator is to enter the first data record according to the program 2 pattern so that certain of the information, such as the date, department, plant code, wage scale in the illustration of FIG. 4, will be automatically duplicated as the machine automatically reverts to Program 1 after the entry of the first record (i.e., switch 26a in the Revert position).

It is also assumed that the ER-HOME key was operated and that the system is in the first memory position with digit 1 in the first horizontal row of display 26 illuminated to indicate such fact. In that digit 2 was placed in Column 1, Program 2 memory during program entry mode, the lamp 2 0 NUM in display section 29 will be illuminated, and the attendant will be informed that the field is a numbers field. With reference to FIG. 4, it is apparent that the entry to be made is in the DATE FIELD. In the present example, it was assumed that the date of May 23, 1969 was to be used, and accordingly the first five entries will be 05, 23, 9.

More specifically, at the time of operation of the ERR-HOM key by the operator preparatory to data entry and Program 2 selected, the information in the memory for Column 1, Program 2 (which as shown in FIG. 4 is digit 2) will be transferred to Program Register B2 during pulse CLK 5 of the cycle pulses CLK X, 1–6 Y. As a result of the registration of digit 2 in the Program Register B2 (FIG. 11) the markings over four conductor path $Q_2$, gates 162b, 163 and four conductor path 164 of the program output select circuit 161 to BCD program decoder 165 results in marking of the digit 2 output conductor of the group 165a, and one input for gate 2 which lights the MSP code lamp 2 in section 29 of display console 14. In addition, the output of decoder 165 (FIG. 12) over output 2 prepares AND gate 159 (FIG. 13) for operation as pulse CLK 6 is received during such cycle. As pulse CLK 6 occurs, gate 159 is enabled to clear letter-number flip-flop 178 (if not already reset) and the shift conductor 200 is marked with logic 0 which is applied over inverter 233 (FIG. 9) to enable number gate circuit 240 (six gates as earlier described) and to inhibit letters gate 241.

As the operator now presses the keyboard key 0, contacts on such key are closed, and the resultant current flow from positive battery over the closed contacts and the associated vertical matrix conductor to an associated diode and common resistor 76 to ground results in marking of the diodes (not shown) in matrix 70 which are connected between the vertical conductor (not shown) and horizontal conductors 8, 2 in the numeric shift section 71. Since number gate 240 is enabled, such markings are extended over gates 242 and path 243 to gates 244.

In addition, as key 0 on keyboard 12 (FIG. 9) is had to mark matrix 70, the key closure via diode similar to 79 but not shown, and path 90 initiates a cycle by strobe generator 79 (FIG. 10). Pulse B output from strobe generator 79 over conductor CL 100 clears data register A 9) of Program data gates A, and pulse C as output over conductor C101 to strobe gate 244 (FIG. 9) extends the markings on the number shift section 71 of matrix 70 over number gates 240, OR gates 242 and strobe gates 244 and OR gates 246 (FIG. 10) to data register A (260—FIG. 11) for registration thereon.

It is apparent that if the program entry for Column 1, Program 2 had been digit 3, the program decode 165 (FIG. 12) would have set letter-number flip-flop 178 (FIG. 10) and the marking on shift conductor 200 would have been a logic 1 which would have prepared the letters gate 241 (FIG. 9) of select data gates 84 to extend the markings on the letter shift section 72 of matrix 70.

Returning now to the cycle initiated by the depression of key 0, as the operator now releases the key, and pulse D (FIG. 14D) is generated by strobe generator 79 such pulse via conductor C102 enables the machine cycle pulse generator MCP to provide cycle pulses X, 1–6, Y in the manner described heretofore.

Pulse CLK X is applied over gates 268 and 116 (FIG. 11) to the data register B and the program register B1, B2 to reset the flip-flops therein and thereby clear such registers for use. Pulse CLK X is also applied to the set line of X–1 FF (not shown) which is reset by CLK 1. CLK 5 is applied to the set line of 5–6 FF (not shown) which is reset by CLK 6. The Q outputs X–1 and 5–6 are "OR-ed" and shown on FIG 14-P and are applied to data select gates 261 (FIG. 11) and program select gates 142, 146. In the data select gates 261, pulse CLK X–1 extending from X to 1 is applied to AND gate 264 which gates the data stored in Column 1 in memory 50 over AND gates 264 and OR gates 265 to the Data Register B (267) as the pulse CLK X is applied to gate 166 as a readout pulse for the memory 50. In the Program 2 select circuit, it will be apparent from the previous description that program select gates will effect readout of the information in Column 1, Program 2 to Program Register B2. That is, with the system in Program 2 by reason of keyboard switch 133 having been operated, PRG 2 conductor will be marked and Program Select gate 141 will provide a logic 1 on Program 2 output conductors 137', 138', and a logic 0 on Program 1 output conductors 137, 138. Accordingly the gate 143 in Program 1 select circuit 142 will be blocked, and the corresponding gate in Program 2 select circuit 146 will pass the information from Column 1, Program 2 to Program Register B2 (128b), as pulse CLK X is applied to gate 166 as a readout pulse for memory 50. Summarily, pulse CLK X effects readout of the information stored in the data and program section of memory for Column 1, Program 2 into Data Register B and Program Register B2 respectively.

As pulse CLK 2 is generated in the machine cycle, such pulse over gate 268 (FIG. 11) clears data register 267, whereby the information previously stored in the data cores of Column 1, Program 2 is destroyed. While the same pulse CLK 2 is also applied to the gate 147 for the program registers B1, B2, it will be apparent that in the data entry or data verify mode, the mode switch 46 in the DATA position opens one input to gate 147, and pulse CLK 2 will not effect the destruction of the program information for Column 1, program 2 which is now registered in program register B2.

As pulse CLK 3 of the cycle is generated, such pulse as applied to gate circuit 263 (six gates) enables the gates to pass the digit 0 as marked in binary code on the six conductor output from the data register A over gates 263 and OR gates 265 and path 266 to the Data Register B (267) for storage thereon. It is noted that pulse CLK 3 is also applied to the program gate 139 which is used in other modes to pass information from program register A to program register B1 or B2. However, in the data entry mode, the program switch 46 is open, and AND gates 139 will not be enabled by pulse CLK 3 to pass the information from program register A to program register B1 or B2.

Pulse CLK 3 is also applied over delay circuit 146' as a write pulse to gate 148, whereby the information in Data Register B and Program Register B1. B2 is restored over paths 276 from Data Register 267 to Column 1 in memory 50 and over path 150 from Program Register 1 and over path 151 from Program Register 2 to Column 1 in memory. In certain embodiments an X bit is similarly written into core to indicate that a non-programmed automatic entry has been made.

Pulse CLK 4 as generated is applied to the data and Program B Register 267, 128a, 128b respectively to clear the same, and also to counter 154 (FIG. 12) to advance the counter one step, which in turn effects selection by address decoder 155 of Column 2 and operation of BCD decoder 160 to light lamp 2 on display section 26.

Pulse CLK 5 as generated is applied to read gate 166 (FIG. 11) for memory 50. CLK 5–6 mentioned before is applied to data select gates 264 to effect readout of the data information in Column 2 over six conductor path 277 and gates 264, 265 and path 266 to Data Register 267. Simultaneously pulse CLK 5–6 is applied to Program 2 select circuit 146 to gate the information output from the cores assigned to Column 2, Program 2 information over four conductor path 124 and the Program 2 select circuit 146 to Program Register B2.

As the data information is registered in Data Register B, the register output over the six $\overline{Q}$ paths to the data display switch gates 276 effects illumination of one of the lamps in the display section 28 which display (assuming no previous information is in the data memory 50) is without significance at this time. However, the program information which has been fed from the cores for Column 2, Program 2 to Program Register B2 appears at the $Q_2$ output of Program Register B2 over the Program select circuit 161 (as will be apparent, gates 161b, 162b are enabled when the system is in Program 2 condition) to the program decoder circuit 165 and the letter-number flip-flop 178 will remain in its previous condition (i.e., indicating a number selection is required in the next keystroke) and the lamp 2 on display 29 will remain energized.

Pulse CLK 6 as applied to the Write gate 148 causes the information in Data Register B and Program Register B2 to be restored into the cores for Column 2 in memory 50. The Data Register B and Program Register B2, being flip-flops, remain in the state to which they were operated by pulse CLK 5 to provide readout information for the display console as described.

With each successive key stroke, a coded bit structure corresponding to the desired character is entered into a successive column in the data section of memory 50. The display section 26 indicates the column in which the information is to be registered and the program display section 29 indicates the nature of the field previously programmed for each column as an aid to the operator in the data entry process. When the last column of the record is keyed, a signal over path 256 to the tape control logic 290 causes logic 290 to start the motion of the tape handler and to deliver a signal over path 352 to gates 330 which effects transfer of the record in data memory 50 via multiple gates 264, 265, 267 and paths 353 and gates 330 to the tape handler. Machine cycle pulses for this process are enabled by tape write clock pulses from tape control logic 290 over path 350 and gate 231 to the MCP at the repetition rate desired for writing on the tape.

Wherever a successful transfer of data is made from data memory 50 to tape, the memory counter 154 is reset to position 1 for the next record entry, and the ready light in section 32 of the display console 14 is lit. If the transfer to tape is unsuccessful, as for example if there is a defective spot on the tape, the tape error light in the same display section 32 will light and the operator will operate the retry switch 51 on console 41. If the retry is successful, the ready light will so indicate.

It should be noted that since the information keyed in by the operator is first placed in memory operator sensed errors may be corrected during data entry by using the MBS key on keyboard 12 to back up the memory 50 to the previously keyed position (i.e., such pulse is fed to the "down" input on counter 154) or by operating the FBS key to back up to the beginning of a field, or by backing up to the beginning of the record by using the HOM key. When the desired position in memory is reached, the operator need only rekey to provide the character desired in the memory.

DATA VERIFICATION

In the data verify mode, the data on tape is read into the data portion of memory 50 and compared, by means of keyboard 12, with the information as rekeyed from the source document. In such mode, the program used during data entry is also used during verification in order to provide the necessary keyboard shift and machine control from field to field.

Briefly the operator in verifying a data record places the machine in the data verification mode by setting switch 46 to data and switch 47 to verify. The record on tape is transferred back into memory by depressing the Release Key. The operator now keys in the data from the source document, and each keystroke results in comparison of the keyed character with the character in memory. The display presents in the keyboard pattern of section 28 the character in memory which is to be verified, while the program display of section 30 indicates by numbers and words the nature of the active field. As long as the keyed character matches the character in data memory the position indicator (and memory) advance one step.

An error condition when the keystroke character and character in memory do not compare will light the red flashing error light 20 (FIG. 2) and lock out the keyboard 12. The column indicator 26 will not advance. If the operator checks the character display and establishes that there is an incorrect character, such character may be corrected by depressing the ER-COR keys and making the proper keystroke. The error in memory 50 is now corrected and verification can continue.

If the operator made a mis-key which resulted in the error condition, it is only necessary to depress the ERR key and key the correct character.

In programming for data verification, the ERR-HOM key is operated to return the system to Column 1. Switches 46, 47, 48 (FIG. 3) are set to the "Data", "Verify", "Off" positions respectively and the REL-OFF switch is selected to the Release Position. The program key is operated to select the desired program (Program 1 in this example), the automatic Skip/Dup/Key 22 is set to the automatic position, and the Release key is depressed. At this time the display indicator 26 will illuminate the lamp for Column 1, the Data, Verify lamps in section 30 will be lit, and digit 0 in the display section 28 will be illuminated.

In that the program entry and verification and data entry procedures have been set forth in detail, it is believed that operation of the system during data verification will be apparent from reference to the following chart, in which it is assumed that the operator is verifying the previously entered data. It will be recalled that in such example the data 05-23-9 was entered in the Date Field. Accordingly, the operator must now depress the key 0 for verification purposes.

With reference to FIG. 8b and FIGS. 9–13 the following operation will be seen to take place:

| Action | Result |
|---|---|
| 1. Depress Release Key | 1. Record on tape read into memory. |
| 2. Depress 0 key on keyboard 12 | 2. A. Strobe Generator 79 — Pulse B clears Data Register A<br>Strobe Generator 79 — Pulse C strobes keyed character from matrix 70 to Data Register A |
| 3. Key 0 released | 3. Strobe Generator 79 — Pulse D enables Machine cycle pulse generator to provide pulse X,1–6,Y |
| 4. Pulse CLK X | 4. A. Clears Data Register B<br>B. Prepares gate 264 of Data Select Gate 261 to Data Register B. |

C. Enables read gate 166 for memory 50 to effect readout of Column 1 into Data Register B NO COMPARISON
With the keyed character in Register A and the character which was stored in Column 1 now transferred to Data Register B, the output of Register A and Register B as applied to comparator 270 (full adder circuit) will compare, signal lights error lamp, and over conductor 272 inhibits gate 152 to prevent CLK 4 from advancing memory 154 until error is corrected.
Steps 5, 7, and 8 below take place except that 7 and 8 apply to Column 1 and Column 1 data since there is no memory advance.

| Action | Result |
|---|---|
| COMPARISON | |
| 5. Pulse CLK 3 | A. Pulse CLK 3 to write gate 148 for memory 50 writes information on Data Register B (digit 0) into Column 1 data memory. |
| 6. Pulse CLK 4 | A. CLK 4 to gate 152 advances counter 154 to effect selection of Column 2.<br>B. CLK 4 clears Data Register B. |
| 7. Pulse CLK 5 | A. Prepares gate 264 of Data Select gates 261 for transfer of information in data memory to Data<br>B. Enables read gate 166 of memory 50 to reach character stored in data Column 2 (Digit 5) into data register B. Data display switch 276 operates to illuminate digit 5 in display section 28; BCD decoder 160 enables Column 2 mark in display section 26, and Program Register B1 enables BCD decoder 165 and lamp gate 2 and 0 NUM lamp on display section 29. |
| 8. Pulse CLK 6 | A. Via gate 148 to memory 50 writes data from Register B into Column 2 data memory. |

DATA DISPLAY 28

As indicated in the above chart, during data verification the keyboard characters which are stored in the data memory 50 are presented on the display section 28 in the same pattern as is used on the keyboard 12. The showing of the characters in the alphanumeric direct readout display, and the arrangement of the characters in the same pattern combine to eliminate the awkward and sometimes complex mental translation which is required of the operators in the use of other known machines. Further the presentation of such information with the column indicator information and the program and field information result in the presentation of a complete picture of the condition of the data processing unit at any given time in a display readout which is easily and quickly assimilated by the user.

With reference to FIG. 12, the keyboard display is shown to comprise a matrix 300 which includes four horizontal conductors and sixteen vertical conductors to provide 64 junctions, permitting representation of up to 64 characters. Each junction includes a lamp which lights its indicated character on matrix 300, one contact of the lamp being connected over an associated diode to the horizontal conductor of its junction, and the other being connected directly to the vertical conductor of its junction.

As will be shown, a lamp will light to illuminate its character on display 28 with the application of 6 volts to the horizontal conductor to which it is connected and the connection of 0.4v to the vertical conductor to which it is connected.

The horizontal conductors of matrix 300 are connected to the output of a BCD decoder 301 which is a decoder commercially available from Texas Instruments under Model SN 7441N, and which has four inputs A,B,C,D. It will be recalled that the data register B provides a six conductor output BA8421 connected to the BA outputs of Register B and the inputs CD are connected to ground. The decoder 301 operates in known manner to mark different ones of the eight outputs in accordance with the binary code inputs which are received from Data Register B over conductors B and A to section 301. Thus, the input 00 from Data Register B to ABCD will mark the output identified 0000 and will enable transistor 302 to connect +6 volt potential to the first horizontal conductor. In a similar manner input signal 01 marks the second horizontal conductor with +6v; input signal 10 marks the third horizontal conductor with +6v, and input 11 marks the fourth horizontal conductor with +6 volt.

The vertical conductors are divided into two groups of eight, one group of eight being connected to the eight outputs of a BCD decoder 303, and the second group of eight being connected to the eight outputs of a BCD decoder 304. The decoders 303, 304 may be of the type commercially available from Texas Instruments as Model SN 7445N which enables a selecte . output with 0.4 volts, nominally a "zero."

The inputs DCBA of decoder 303 are connected to the 8421 conductors in the Q path from Data Register B, and the inputs of decoder 304 are connected to the 8421 conductor output from Data Register B. The particular output which is marked by a given input is obvious from the binary markings which appear at the outputs of decoders 303, 304.

By way of brief example, the letter J is represented in the binary code by the markings 10 0001 (B- - - - 1). Accordingly, decoder 301 marks the third horizontal conductor (0010) with +6 volt potential and decoder 303 marks the second vertical conductor (0001) with +0.4v potential to energize the lamp for letter J. With reference to letter I (BA8 - - 1) it will be apparent that the fourth horizontal conductor (0011) and the 10th vertical conductor (1001) will be energized to illuminate the lamp for letter I. The manner in which the rest of the display is enabled will be apparent therefrom.

It is noted that matrix 26 is of a similar structure with the exception that the decoder 301 has eight outputs to provide a total of 256 matrix parts. In addition, the matrix junctions 20, 40, 60, 80, 100, 120, 140, 160, 180, 200, 220, 240 are connected via the record selector switch to the counter 154 to signal the detection of the selected length. The counter is allowed to advance one additional position and this position is signalled over path 257 to OR gate 188 to serve as a "Fake" or synthetic MSP.

TAPE RELEASE

As entry and/or verification of a record is completed, the memory counter 154 will have been advanced to the eightieth column (i.e., this being the record length established by setting of the record selector switch 44—FIG. 3) and a signal is provided by matrix 26 (which is similar to display matrix 28) over path 256, gate 356 and path 256a to tape data logic circuit 290 to effect tape movement in a data entry. In one embodiment the tape logic effects a movement in a forward direction, stops, moves backwards over the record, stops, and moves forward again and stops. The first forward movement writes the record from the memory 50 to tape without destroying the data in memory 50. The backspace positions the tape so that the second forward motion "reads" the record of data just entered and feeds it over path 314, OR gate 246 to Register A, 260, for comparison with the data in memory. If the data transfer is successful, the ready lamp on the display section 32 is lit. If the transfer is not successful, the tape error lamp is lit and the retry switch 51 is operated in a further attempt to transfer.

This (the retry) will backspace over the record, move the tape forward 7 inches with erase of old data, re-write the record, stop, backspace over the re-written record, stop and then read forward to the inter-record gap just beyond the record. The initial forward movement erases the erroneous record and "re-writes" the record on a new portion of tape. The tape backspacing positions the tape for a new "read" function during the next forward tape motion after which the tape stops in the inter-record gap just beyond the record.

With reference to FIGS. 9–13 the following table sets forth the circuit operation effecting release to tape after data entry.

| | |
|---|---|
| 1. Counter 154 (FIG. 12) advances to position 80. | A pulse over path 256 to tape data logic 290. Pulse over conductor 350 to OR gate 231 (FIG. 10) starts machine cycle pulse generator MCP in generation of pulses CLK X, 1–6, Y. Counter returns to Column 1. |
| 2. CLK X Clears Data Register B. Prepares data select gates 261 to forward data in Column 1 for memory 50 to data register 267. | |

DUPLICATION

During data entry, as indicated heretofore, the DUP key on keyboard 12 provides means for manually duplicating data fields and the DUP circuitry will automatically stop the duplicating process when a program stop code is encountered. With reference to the example described above and shown in FIG. 4, the digit 4 in the MSP columns 1, 6, 36, 47, and 70 indicate that the date, department, plant code, wage scale and division name fields are DUP blocks which will automatically repeated from card to card. The method in which the circuitry effects such duplication is now set forth.

Assuming that the ERR-HOM keys on keyboard 12 have been depressed, the counter 154 (FIG. 12) and address decoder 155 return the system to position 1 in memory, and during the resultant series of clock pulses which result in the return of the system to column 1, (and specifically with the occurrence of pulse CLK 5 in such series), digit 4 which was stored in cores for column 1, Program 1 during the Program Entry mode will be read into Program Register B1 (FIG. 11). As the digit 4 is registered in Program Register B1, the corresponding markings on the four-conductor path Q1 over gate 162a (FIG. 12), OR gate 163, path 164a to BCD program decoder 165 results in the marking of the output conductor 4 in cable 166a to the one input of gate 306, the output of which is connected to the set terminal of the DUP flip-flop 307. At such time as the pulse CLK Y of the same cycle is received, gate 306 will be enabled and provided switch 22 on keyboard 12 (FIGS. 2 and 13) is closed, the DUP flip-flop 307 will be set to provide logic 1 over conductor 286 (FIGS. 13, 10) to the start input for machine cycle pulse generator MCP (FIG. 10).

Machine cycle pulse generator MCP generates the pulse CLK X, 1–6, Y as described heretofore and pulse CLK X output to the data register A (260) (FIG. 11) clears the data register A. The same pulse CLK X to data register B over gate 268 clears data register B (267) (FIG. 11) and over gate 116 and path 132 clears program registers B1 and B2 (128a and 128b). Pulse CLK X also enables read gate 166 for memory 50 to effect readout of the information in the cores of memory assigned to store the data for Column 1 over six conductor path 277, gate 264 and 265 and six conductor path 266 for registration in the data register 267. Simultaneously, program information stored in the cores assigned to Column 1 for Program 1 are read out over four-conductor path 122 and gates 143, 145 and four-conductor path 126 to program register B1 (128a). The program information (digit 4) which appears on path Q1 output from the program register 128a, has no further effect beyond that achieved when the digit 4 was placed in the program register B during the pulse CLK 5 of the previous cycle.

The generation of pulse CLK 2 in the present cycle is without effect, since the signal from DUP F.F.307 over line 286 and 286a to gate 334 (FIG. 11) is inverted by inverter 335 and inhibits clock 2 in gate 310, preventing it from clearing Data Register B. As pulse CLK 3 is generated and applied over delay circuit 146' to write gate 148 for memory 50, the information in the data register B (267) and the program register B1 (128a) are read back into the cores which are assigned to the program and data storage for Column 1 of the data and Program 1 memories respectively. It will be apparent therefore that in this cycle the information which was stored in Column 1 of the data section in the previous entry was taken out of data at pulse CLK X and placed in data register B and as pulse CLK 3 occurred, was returned from data register B (267) over path 276 back into the same cores in the data memory for Column 1. It will be apparent therefore that the information which was stored in memory during the previous block entry has been returned to memory, or in other words has been duplicated for the data block now being placed in the data memory. Additionally, the information assigned to Column 1 for program 1 has been placed back in the program cores for subsequent use. The same is true for Program 2, although Program 2 is not pertinent to the present example.

As pulse CLK 4 is now generated, the memory counter 154 (FIG. 12) is incremented one step to position 2, and a read/restore operation occurs at pulse CLK 5 and 6. That is, with the occurrence of pulse CLK 5, the information stored in the data cores assigned to Column 2 are read over path 277, gates 264, 265, path 266 into data register (267) and with the occurrence of pulse CLK 6 the digit in the data register B is read back over path 276 to the cores assigned to Column 2 for the data portion of memory 50.

The information in the cores assigned to Column 2 for program 1 in memory 50 are similarly controlled in a read/restore operation provided by pulses CLK 5 and CLK 6, the information being read into program register B1 during pulse CLK 5 and being returned over path 150 to the same cores in program 1 during pulse CLK 6. During the period the information for column 2 is stored in program register B1, it will also be applied over path Q1 to the program decoder 165 in a sampling for an MSP. In the example set forth in FIG. 4, the second column will have a space, and accordingly the program decoder 165 will not detect an MSP, and the DUP flip-flop 307 will remain in the set condition.

As the system advances to column 6 (during pulse CLK 4 of the cycle initiated when the system advanced to column 5), the MSP 4 will be once more detected, and the DUP flip-flops 172 and 307 will remain in the set condition. Accordingly, the DUP cycle is continued through Columns 7, 8 and 9 (the information in the cores assigned to Columns 6, 7, 8, 9 is read out and restored in the successive machine cycles).

During the period that the system is duplicating the information in the cores for column 9 and the pulse CLK 4 occurs, the memory counter 154 is incremented one step to column 10. With the occurrence of pulse CLK 5, the program 1 information in the cores assigned to column 10 is read over path 122, gates 143, 145, path 126 to program register B1 (128a). In the present example, it was assumed that digit 2 was stored in the data cores for column 10, and accordingly as such digit is registered on program register B1 the information output over path Q1 (FIG. 12), gate 162a, 163 and four-conductor path 164, 164a to program decoder 165 results in marking of output conductor 2 and a logic 1 signal on one input of gate 159 (FIG. 13). Such operation is without effect, however, since letters number flip-flop 178 has been and is in the reset condition to mark no input via path 200 to select data gate 84.

In addition, the digit 2 output from program register B1 over path Q1 is also fed over gates 162a, 163, path 164b to OR gate 188 (FIG. 13) of the MSP detector.

As the cycle advances to pulse CLK Y, gate 193 (FIG. 13) is enabled to place logic 1 on one input of gate 308 which has a second input marked by 4̄ input. Gate 308 as thus enabled places logic 1 on the reset terminal R of DUP gate 307 which resets to remove logic 1 from start conductor 286 and thereby terminate the automatic cycling of the equipment and the duplication process.

For purposes of explanation, it should be recalled from the earlier description that the first block of data was entered into the system with the system set in the Program 2 mode, and that at the end of such entry the machine automatically reverted back to the Program 1 mode. However, the data which was entered into the system when the station was in the Program 2 mode will be in the data cores assigned to each of the columns, and the particular program selected will in no way change the stored data (i.e., it is the same data for both programs). Thus even though the system is now operating in Program 1 mode, the data placed in the data cores in Program 2 mode is being duplicated in the present block.

If the data station is set up for data entry with the program switch off, each memory position may be duplicated by a depression of the DUP key. Machine cycles will be initiated but will last only until CLK 6 of the first machine cycle in which the program 3 MSP is detected.

DUP DATA VERIFY

During data verification, either the DUP key or Program code 4 may be used to automatically verify fields that remain the same from record to record. The DUP key may be depressed anywhere within a field and automatic verification will occur until the next MSP other than Program 4 is detected.

Verification of data in memory is normally accomplished by reading the character in memory in Register B and comparing this character with the contents of Register A. During the DUP verification, however, it is only necessary to verify that the character released from tape is not changed from the previous record.

LEFT 0 FILL

Whenever the data being entered into a field does not fill the assigned field to capacity, the Left 0 Fill key may be used to right justify the data and fill the lead in memory positions with zero. Thus, by way of example with reference to FIG. 4, it may be assumed that the wage Columns 25–35 are of the type which will vary for the different data blocks, and that it is desired, for compatability purposes, that the digits representing the wages for the different blocks will always appear in the last columns of the series which end at Column 35. Thus, a wage in the amount of $43.21 should appear in Columns 30–35 respectively ($43.21). However, entry of the data will proceed more rapidly if the operator upon reaching Column 25 need merely key the amount $43.21 without stopping to determine the ultimate location of the information, and then depress the Left 0 Fill key to enable the system to shift the keyed information from Columns 25–30 to Columns 30–35 and to automatically fill the leading positions (Columns 25–29) with zeros.

By way of brief description, when the wages have been entered into the Columns 25–29 and the Left 0 Fill is depressed, memory is advanced (without entry of bits into the memory location) until the MSP of the next field is detected (digit 4 in Column 36). As the MSP for the next field is detected, the memory counter 154 is decremented until the last data character entered into the field is detected (in the present example the digit 1 in Column 30). The data character (digit 1) is then transferred from register B (267) (FIG. 11) to register A (260) where it is held temporarily. The counter 154 is then incremented until the MSP (4 in column 36) is again detected. The counter 154 is now decremented one position and the data character (digit 1) stored in the register A (260) is transferred to register B (267) and entered into the cores for the Column 35 (MSP-1) of memory 50.

The counter is then again decremented until the next to the last character entered (digit 2 in the present example) is encountered in Column 29 and the cycle repeats as before, the counter 154 advancing to the memory position corresponding to the previous data character (Column 35) and backing off one step to enter the second character into column 34 (address MSP-2). The cycle is repeated in this manner until all of the data characters have been right justified (the characters $43.21) have been stored in columns 30–35). After the last character has been transferred to the right, the counter is decremented until the MSP preceding the field is detected (program code 2 in Column 25) and memory is once more incremented by advancing the counter 154 and entering zero codes into each memory location (Columns 25–29) which precede the data characters which are now located in Columns 30–35. The data characters are then read and restored until the MSP (program code 4) of the next field (Columns 36–46) is detected. The circuitry for effecting such mode of operation is set forth in FIGS. 16 and 17 and is described in detail hereat.

As indicated above, the left zero fill logic serves to right-justify the characters in a partly filled field by moving them from left to right without disturbing their order. Unused columns are then automatically filled with zeros.

Figure 16:
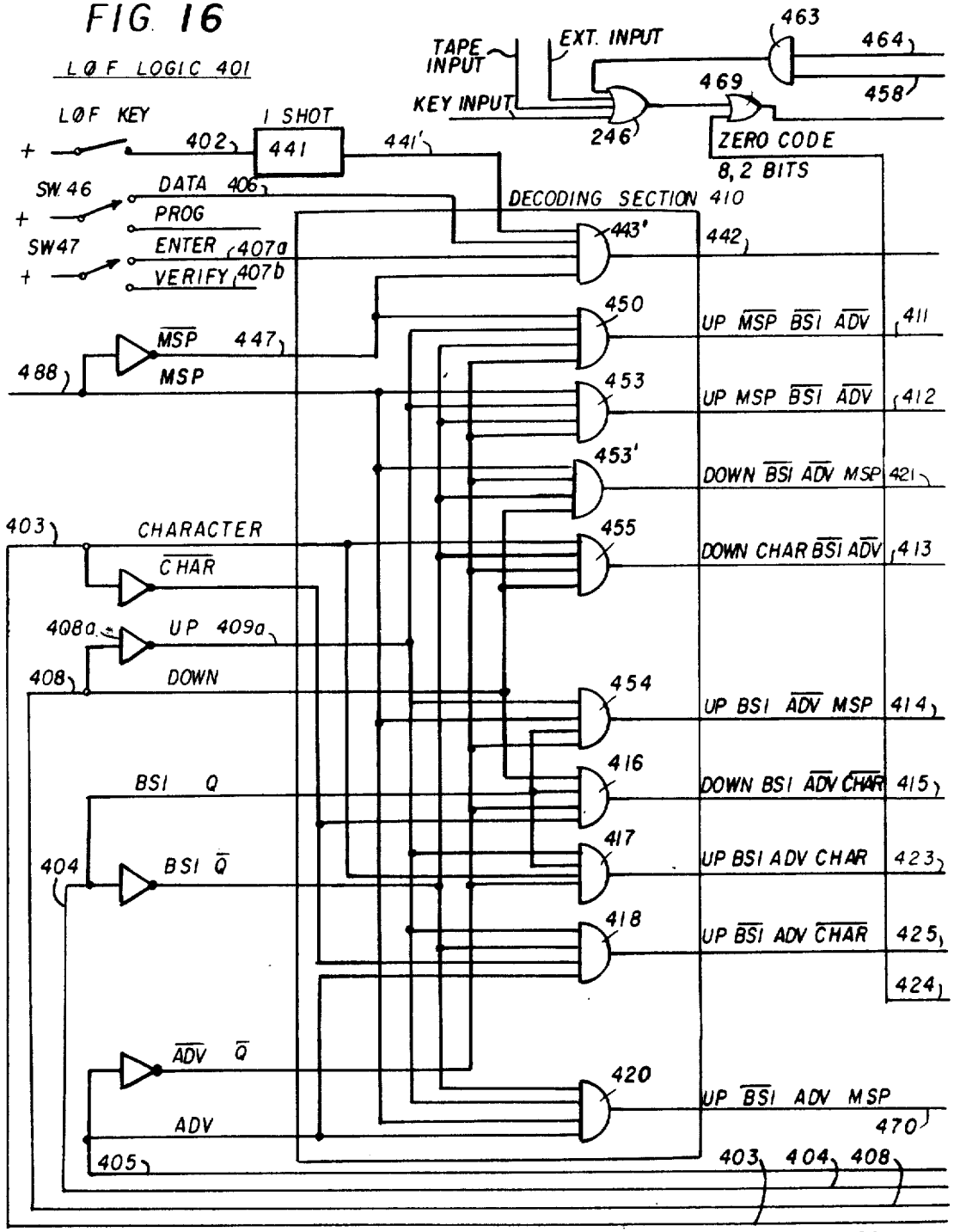

The LOF operation as was further described depends upon the ability of the logic to advance the address counter 154 (FIG. 12) up and down between the columns which store the MSP's or characters. More specifically, when an MSP is encountered in the incrementing and decrementing of the counter 154, the MSP detector 188 (FIG. 13) signals this fact via line 488 to the LOF logic 401 (FIG. 16).

When a character is encountered in memory, a character detector such as OR gate 456 (FIG. 17) which has six inputs connected to the six outputs of Register B 267 provides a marking signal over conductor 403 to a further input for the logic gates 401. In one embodiment, rather than using a six bit detector 456, such indication was provided by tagging each keyed character with a separate seventh bit which is then used as a bit indicator. Either method will provide the desired character indication for the logic circuit which is necessary to the LOF operation of the present disclosure.

The logic circuitry 401 is prepared to operate in different modes in accordance with the signals which are provided by the DATA, ENTER, or VERIFY switches 46, 47 (FIGS. 3 and 16) over conductor 406, 407a, 407b, respectively. Additional inputs to logic circuit 401 include a positive potential signal on LOF conductor 402 which is provided with closure of the LOF key on keyboard 12; an MSP signal which is input over conductor 488 from the MSP detector 188 (FIG. 13); a character signal which is input over conductor 403 from the character detector 456 (FIG. 17) described above; up, down signals input over conductor 408 from the Q output of a down flip-flop 451 (FIG. 17) associated with memory counter 154 (FIG. 12); a BS1 input over conductor 404 and an ADV signal input over conductor 405 (FIG. 16) to be described.

The input signals are recognized and processed by the LOF decoding logic circuitry 410, which via outputs 411–415 and 421–425 and 470 condition the encoding section 430 to effect various functional operations. A further essential part of the LOF logic 401 (FIG. 16 and 17) includes the four flip-flops 443, 451, 445, 446, three of which provide the Up, Down; Backspace BS1, $\overline{BS1}$; and Advance signals ADV, $\overline{ADV}$ to the input for the decoding section 410.

Responses of the logic circuitry 401 in a LOF operation are now set forth with reference to the wage field (Columns 25–35) shown in FIG. 4. It will be assumed in the description that the system is in program 1 and the data-entry mode, and that the operator has entered $43.21 by entering $ in Column 25, 4 in 26, 3 in 27, period in 28, 2 in 29, and 1 in 30 in the manner set forth in the data entry description. As such entry is complete the counter 154 (FIG. 12) will have selected column 31, and the system awaits a further key depression. The operator now depresses the LOF key, which is one of the Special Function keys on keyboard 12.

With closure of the LOF key (FIG. 16) positive potential is fed over input conductor 402 to a one-shot strobe generator 441 which provides an enabling pulse over output 441' for gate 443' in decoding section 410. With conditions Data, Enter satisfied by reason of switches 46, 47 being in the Data-Enter positions to place logic 1 on conductor 406, 407a, and MSP satisfied (i.e., there is no MSP in column 31 and conductor 488 is marked with logic 0 and conductor 447 has logic 1), gate 443' via conductor 442 will set LOF flip-flop. The Q output via conductor 444 and OR gate 231 enables the machine cycle pulse generator MCP (FIG. 10) which cycles in the manner described to advance the system over the successive positions in memory 50. As will be shown the LOF flip-flop 443 remains set until the LOF operation is completed.

The direction of operation of counter 154 (i.e., advance in this case) in response to pulse CLK 4 of the successive pulse cycles is determined by flip-flop 451 in flip-flop section 440 (FIG. 17). At this time (i.e., when the LOF key is depressed, the flip-flop 451 is in the reset state and the $\overline{Q}$ output (logic 1) on conductor 408b marks the counter for an "Up" count.

The Q output (logic 0) from flip-flop 451 is fed over conductor 408 and inverter 408a and conductor 409a together with $\overline{Q}$ outputs of BS1 flip-flop 445 and ADV flip-flop 446 (both of which are reset at this time) and with the $\overline{MSP}$ signal on conductor 447 gate 450 is enabled to provide an output on conductor 411, which over OR gate 431 in encoding section 430 marks line 452 over OR gate 452' to AND gate 453. As pulse CLK X occurs over gate 268 the Data Register B (267) is cleared, and the information on the data cores for the selected column is read into Data Register B as described heretofore. As pulse CLK 2 occurs in each of the machine cycles which are repeatedly provided with the LOF flip-flop 443 in the set condition, gate 453 is enabled and via OR gate 268 clears Register B 267 (gate 268 and Register B 267 are also shown in FIG. 11, but are reproduced in block form in FIGS. 16 and 17 to minimize repeated cross reference thereto) so that the information in such column is in effect destroyed.

Thus, in the present example during the first machine cycle resulting from depressing of key LOF when the system is in address 31 of memory, pulse CLK X via gate 268 (FIGS.17 and 11) clears Register B and via gate 166 reads the information in the cores for Column 31 over path 277, 264, 265, 266 to Register B. Since the readout of cores is destructive, the cores are at this moment devoid of information, and such information is in Data Register B. When the Data Register B 267 (FIG. 11) is next cleared on pulse CLK 2, the information is in effect destroyed. The information in the Program Register B 128 (FIG. 11) however is not destroyed on pulse CLK 2.

On pulse CLK 3, write gate 148 is enabled to write the contents of both data and program Registers B into the cores assigned to data and program information for column 31, in the manner earlier described. (Zeros or "NO BITS" are written in the cores for Column 31 of the data section). On pulse CLK 4 of the first cycle the counter 154 advances the system to column 32. On pulse CLK 5, via read gate 166 the cores assigned to data and program for Column 32 in memory 50 are read to determine whether an MSP was stored in the program cores for Column 32 (i.e., the program information is placed in Program B Register 128a (FIG. 11) and if an MSP is present such MSP is detected by the MSP circuit 188 in the manner described heretofore. On pulse CLK 6, the contents of Registers B (Data and Program) are restored over path 276 for Data and 150 for Program to the cores for column 32 in memory. CLK Y performs no function in this sequence. The foregoing steps are outlined in steps 1, 2 of the LOF chart which is shown hereinbelow.

Since no MSP was detected the states of flip-flops 443, 451, 445 and 446 (FIG. 17) remain unchanged, and another machine cycle is initiated to generate pulses CLK X–Y and the sampling of a successive column in search of an MSP. Since columns 33, 34, and 35 do not contain MSP's the system advances, clearing the data from the cores for each column in this manner until column 36 is reached. At that time, as the pulse cycle occurs, and pulse CLK 5 reads the core for column 36 into Program Register B (FIG. 11) the MSP detector 188 (FIG. 13) detects the digit 4 and marks line 488 to indicate that column 36 has an MSP. The numeric value of the MSP is not of consequence. During pulse CLK 6 of the machine cycle the contents of the Program and Data B registers 128a and 267 are restored to the cores for column 36 in memory as previously described.

The presence of the MSP as marked on conductor 488 signifies a new condition to the LOF logic circuit 401. That is, with logic 1 on the input conductor 488 (FIG. 16) from the MSP detector 188 (the logic 1 on conductor MSP, $\overline{BS1}$ and $\overline{ADV}$ have not changed), decoder gate 453 is enabled to provide a "one" output on output 412 which via OR gate 433 provides a command over path 455 to set the Down flip-flop 451, to condition the system for decrementing the address at the pulse CLK 4 of the next machine cycle.

Since line 452 is no longer marked, gate 453 is disabled and CLK 2 does not clear Register B. Thus the logic performs a Read-Restore cycle which preserves the conditions of the memory for column 36. The operation just described is shown in setp 3 of the LOF chart.

With the Down flip-flop 451 set and the Q output to counter 154 marked with logic 1, the machine cycles next generated by LOF flip-flop 443 (which is still set) drive the counter 154 downwardly over Columns 35, 34, 33, 32 and 31. That is, as the counter decrements one step to Column 35, ($\overline{BS1}$, $\overline{ADV}$ have not changed) and since the sampling of the first column (34) in the downward step indicates no character ($\overline{CHAR}$), the system circuit remains in its "search-for-a-character" mode. Such operation is illustrated in step 4 of the LOF chart, and such operation is maintained until a character is detected.

When the system finally reaches column 30 (where the last character 1 of the information $43.21 was entered) and as pulse CLK 5 occurs, such digit is placed in data Register B and the existence of the character (as distinct from no bits found in Column 31 to 35 just traversed) is determined during pulse CLK 6 by character detector 456 (FIG. 17) which OR's all the data bits in data register B and feeds such indication over conductor 403. (As noted earlier, as an alternative, a K bit may be used as an indicator in a seventh core, since it would never be found in memory unless a character existed in the same address).

The presence of the character signal detected by detector 456 and the resultant logic 1 over conductor 403 enables gate 455 in decoding section 410 (i.e., the logic 1 signals on the Down, $\overline{BSI}$, $\overline{ADV}$ inputs have not changed and the occasion of the CHAR marking results in enablement of gate 455 which in turn provides logic 1 over conductor 413 to (a) pick up the detected character—digit 1 in the present example—, (b) clear the data in core for column 30, and (c) increment the counter upward. Such control is shown in step 5 of the LOF chart.

More specifically, gate 455 as enabled provided logic 1 via conductor 413 to OR gates 431, 432, 434, 435 and 436 which provide logic 1 over conductors 452, 458, 457, 460 and 461 respectively.

As noted above, as the result of detection of digit 1 in column 30 during pulse CLK 6 of the cycle which occurred as the system stepped from column 31 to column 30, the resultant enablement of gate 455 and logic 1 over OR gate 434 to conductor 457 prepares gate 461 for enablement by CLK X in the next machine cycle. As the next cycle occurs (i.e., with the system at column 30), pulse CLK X enables gate 461 and the output over OR gate 462 clears data Register A (260).

In addition, as gate 455 was enabled responsive to detection of the digit 1 character in column 30, the signal over conductor 413, OR gate 432, and line 458 enables gate circuit 463 in the six conductor path 464 which extends the output of Register B to the input OR gates 246 and 469 for Register A. This path is actually six lines of data and gate circuits, such as 463, 246, 469, comprise a group of gates, each of which is enabled to transmit the signal on a corresponding one of the conductors. As pulse CLK X is generated in the next cycle, the digit 1 is read from the data cores for column 30 in memory into Register B (267) and the digit 1 in Register B is transmitted over path 464, gates 463, 246, 469 for loading into Register A. Digit 1 is held in storage in Register A as the system is advanced over Columns 31, 32, 33, and 34 to Column 35.

In addition to the described operation, the enablement of gate 455 as the character "1" was detected in column 30, and the resultant signal on conductor 413 via OR gate 431 and conductor 452 and gate 452' prepares gate 453 for enablement by pulse CLK 2 in the next cycle to clear Data Register B.

Finally, the output of gate 455 responsive to detection of digit 1 in column 30 is effective via conductor 413, OR gate 435 and conductor 460 to reset the Down flip-flop 451 (reset of flip-flop 451 is effected as the pulse CLK 3 is generated during the cycle after which the character was detected), and via OR gate 436 and conductor 461' sets the BS1 flip-flop 445 in preparation for a later sequence.

It will be apparent from the foregoing description that as the character 1 is detected in Column 30, the gate 455 via encoding section 430 has prepared the system to clear Register A and to transfer the digit 1 stored in data memory for column 30 to Register A at CLK X of the next cycle, and at pulse CLK 2 of such cycle to clear Register B, and thereby prevent such digit 1 from being placed back in the cores for Column 30.

On pulse CLK 3, the empty Register B is read into the memory resulting in "NO BITS" or an empty column 30 where the character 1 had been. However, the digit 1 remains loaded in Data Register A 260 for transport to Column 35.

Pulse CLK 4 of such cycle advances the counter 154 upward (it being recalled that the flip-flop 451 has been reset provide an UP command over $\overline{Q}$ conductor to counter 154). At pulse CLK 5, contents of the next column or address 31 are read into Program Register B which column is, in the present example, empty. On pulse CLK 6 the "NO BITS" information is restored to the cores for column 31.

At this time with flip-flop 451 reset, the logic enables the system in a read/restore operation and advancement of the counter 154 in search of an MSP, and the system advances through columns 31, 32, 33, 34 and 35 in search of an MSP. Such operation is shown as step 6 in the LOF chart.

As the successive cycles occur in such search, read/restore cycles are performed on CLKs 1 and 3, and pulse CLK 4 advances the system to successive columns until column 36 is reached.

In the cycle in which column 36 is read into Program Register B (i.e., pulse CLK 6 of the cycle for column 35) the MSP in Column 36 (digit 4 in this example) is detected by MSP detector 188 (FIG. 13) and the resultant signal on conductor 488 (FIG. 16) marks a new condition. Recalling that the BS1 flip-flop 445 is now set (i.e., at the time the system detected the digit 1 in column 30 the BS1 signal together with the new signal MSP and the existing signal UP, and $\overline{ADV}$ input to gate 454 provide an output over conductor 414 as a new command to the encoding section 430) gate 433 in encoding section 430 provides logic 1 over conductor 455a to set the Down flip-flop 451.

The MSP is read and restored in the following cycle. This operation is shown in step 7 of the LOF chart.

As pulse CLK 4 is fed to counter 154 during this cycle, the counter moves down to column 34. During pulse CLK 6 of such cycle, the absence of a character ($\overline{CHAR}$), together with the DOWN signal indicates a new condition which is decoded by gate 416 (step 8 of the LOF chart) and the resultant output command on conductor 415 is fed over OR gate 439 and conductor 462' to reset the backspace flip-flop BS1 on the next CLK 3 in preparation for a future sequence.

As pulse CLK 2 occurs with the system at column 35, the output of gate 416 over conductor 415 and OR gate 431, conductor 452 and gates 453 and 265 clears Register B 267. The output of gate 416, over conductor 415, OR gate 439', conductor 463' and gate 464 allows pulse CLK 3 to reach gates 263 and transfer the character 1 which has been stored in Data Register A via gates 265 and six line path 266 to Data Register B.

On pulse CLK 3 delayed, via gate 148, the digit 1 registered in Register B 267 is read over path 276 into the cores for column 35 in memory 50. This completes the right-justification of the character 1.

The counter continues to be incremented downwardly (step 9 of the LOF chart) while the machine cycle reads and restores the "no" bit codes encountered in the empty addresses. The manner of such operation will be apparent from the foregoing description.

When address 29 is reached, the presence of the character 2 is detected in the same manner that character 1 was located. This new condition is again decoded in decoder section 410 and encoded in encoding section 430 to cause the character 2 to be loaded into Register A and transported to address 34 where it is deposited into core. Each time the memory advances upward in this sequence, it must overstep by one address to determine when the MSP or character is reached, and then backspaces one column before depositing the character carried in Register A. The remaining characters are in turn transported to their new addresses, each in turn in the manner set forth above. The specifics will be apparent from the foregoing description and LOF chart.

| STEP | CONDITIONS REQUIRED | GATE | X CLR "A" | X CLR "B" | X READ CORE → "B" | X READ "B" → "A" | X LOAD "A" ZERO | 1 NC | 2 CLR "B" | 3 MOD "A" → "B" | 3 WRITE "B" → CORE | END OF CLOCK 3 U/D POS. | BS1 POS. | ADV POS. |
|---|---|---|---|---|---|---|---|---|---|---|---|---|---|---|
| 1 | KEYSTROBE, LØF KEY MSP, ENTER DATA | 443 | | | | | | | | | | | | |
| 2 | UP, BS1, ADV, MSP | 450 | - | X | X | - | - | - | X | - | X | UP | BS1 | ADV |
| 3 | UP, BS1, ADV, MSP | 453 | - | X | X | - | - | - | - | - | X | DN | BS1 | ADV |
| 4 | DOWN, BS1, ADV, CHAR | | - | X | X | - | - | - | - | - | X | DN | BS1 | ADV |
| 5 | DOWN, BS1, ADV, CHAR | 455 | X | X | X | X | - | - | X | - | X | UP | BS1 | ADV |
| 6 | UP, BS1, ADV (CHAR OR MSP) | 455' | READ/RESTORE CYCLE WHILE LOOKING FOR MSP | | | | | | | | | | | |
| 7 | UP, BS1, ADV, MSP | 454 | - | X | X | - | - | - | - | - | X | DN | BS1 | ADV |
| 8 | DOWN, BS1, ADV, CHAR | 416 | - | X | X | - | - | - | X | X | X | DN | BS1 | ADV |
| 9 | DOWN, BS1, ADV, CHAR | 455 | X | X | X | X | - | - | X | - | X | UP | BS1 | ADV |
| 10 | UP, BS1, ADV (CHAR OR MSP) | | READ/RESTORE CYCLE WHILE LOOKING FOR CHAR BIT | | | | | | | | | | | |
| 11 | UP, BS1, ADV, CHAR | 417 | - | X | X | - | - | - | - | - | X | DN | BS1 | ADV |
| 12 | DOWN, BS1, ADV, CHAR | 416 | - | X | X | - | - | - | X | X | X | DN | BS1 | ADV |
| 13 | DOWN, BS1, ADV, CHAR | | READ/RESTORE CYCLE WHILE LOOKING FOR CHAR BIT | | | | | | | | | | | |
| 14 | DOWN, BS1, ADV, CHAR | 455 | X | X | X | X | - | - | X | - | X | UP | BS1 | ADV |
| 15 | UP, BS1, ADV, CHAR | | READ/ RESTORE CYCLE WHILE LOOKING FOR CHAR BIT | | | | | | | | | | | |
| 16 | UP, BS1, ADV, CHAR | 417 | - | X | X | - | - | - | - | - | X | DN | BS1 | ADV |
| 17 | DOWN, BS1, ADV, CHAR | 416 | - | X | X | - | - | - | X | X | X | DN | BS1 | ADV |
| | --- CYCLE REPETITION TO COMPLETE TRANSPORT OF ALL CHAR IN FIELD --- | | | | | | | | | | | | | |
| 18 | DOWN, BS1, ADV, MSP | 453' | X | X | X | - | X | - | X | X | X | UP | BS1 | ADV |
| 19 | UP, BS1, ADV, CHAR, MSP | 418 | X | X | X | - | X | - | X | X | X | UP | BS1 | ADV |
| 20 | UP, BS1, ADV, CHAR | | - | X | X | - | - | - | - | - | X | UP | BS1 | ADV |
| 21 | UP, BS1, ADV, MSP | 420 | RESETS LØF FLIP-FLOP ON CLK Y OF LAST MACHINE CYCLE | | | | | | | | | | | |

| STEP | REMARKS |
|---|---|
| 1 | |
| 2 | AUTOMATICALLY COUNTING UP AND CLEARING CORE |
| 3 | FINDS MSP AND RESTORES IT, CLOCK WILL DECREMENT THE UP-DN COUNTER |
| 4 | READ/RESTORE CYCLE, LOOKING FOR A CHARACTER |
| 5 | DECODES CHAR, LOADS DATA B→A FOR STORAGE, RESTORES NO BITS, COUNTS UP TO MSP |
| 6 | |
| 7 | READ/RESTORES MSP |
| 8 | TRANSFERS DATA A→B, DEPOSITS INTO CORE |
| 9 | FINDS CHAR, LOADS DATA INTO B TRANSFERS DATA TO "A", STORES NO BITS INTO CORE |
| 10 | |
| 11 | READS CHAR. AND RESTORES DATA AND CHAR. TO CORE |
| 12 | RECOGNIZES CHAR, TRANSFERS DATA A→B AND DEPOSITS INTO CORE |
| 13 | |
| 14 | FINDS CHAR, LOADS DATA INTO "B" TRANSFER DATA A→B STORES NO BITS INTO CORE |
| 15 | |
| 16 | READ CHAR. AND RETURNS DATA AND CHAR TO CORE |
| 17 | RECOGNIZES CHAR, TRANSFERS DATA A→B AND DEPOSITS INTO CORE |
| 18 | RECOGNIZES MSP, LOADS A WITH ZERO TRANSFERS A→B, WRITE ZERO INTO CORE |
| 19 | GOES UP, PLACING ZEROS INTO CORE LOOKING FOR CHAR. |
| 20 | WHEN CHAR. IS RECOGNIZED, NO MORE ZEROS PLACED INTO CORE |
| 21 | |

| STEP | 4 INCRE COUNT | 5 READ CORE "B" | 6 WRITE "B" CORE | Y WAIT | LØF FF1 | REMARKS |
|---|---|---|---|---|---|---|
| 1 | | | | | SET | SET LØF FF TO INITIATE ACTION, STARTS AUTO MACHINE CYCLE |
| 2 | X | X | X | | SET | EVENTUALLY SEES MSP; SETS UP CONDITIONS FOR STEP 3 |
| 3 | X | X | X | | SET | COUNTS DOWN, LOOKING FOR CHAR; SETS OF STEP 4 |
| 4 | X | X | X | | SET | CONTINUES COUNTING DOWN UNTIL A CHAR. IS FOUND AND SETS UP STEP 5 |
| 5 | X | X | X | | SET | CONTINUES UP, UNTIL MSP IS DECODED; SETS UP CONDITIONS FOR STEP 6 |
| 7 | X | X | X | | SET | AFTER RESTORING MSP, STARTS DOWN LOOKING FOR CHAR (STEP 8) |
| 8 | X | X | X | | SET | AFTER DEPOSITING DATA, CONTINUES DOWN LOOKING FOR CHAR (STEP 9) |
| 9 | X | X | X | | SET | STARTS UP, LOOKING FOR CHAR. |
| 10 | | | | | | WHEN CHAR. IS DECODED SETS UP CONDITIONS FOR STEP 11 |
| 11 | X | X | X | | SET | STARTS DOWN, LOOKING FOR CHAR. |
| 12 | X | X | X | | SET | SETS UP CONDITIONS FOR STEP 13, COUNT DOWN TO NEXT CHAR. |
| 13 | | | | | | WHEN CHAR IS DECODED, SETS UP CONDITIONS FOR STEP 14 |
| 14 | X | X | X | | SET | STARTS UP, LOOKING FOR CHAR. |
| 15 | | | | | | WHEN CHAR IS DECODED, SETS UP CONDITIONS FOR STEP 16 |
| 16 | X | X | X | | SET | STARTS DOWN, LOOKING FOR CHAR |
| 17 | X | X | X | | SET | SETS UP CONDITIONS FOR STEP 18, COUNTS DOWN TO CHECK OR MSP |
| 18 | X | X | X | | SET | STARTS UP, DEPOSITING ZEROS INTO CORE |
| 19 | X | X | X | | SET | CONTINUES UP, UNTIL CHAR IS RECOGNIZED |
| 20 | X | X | X | | SET | READ/RESTORE DATA UNTIL MSP IS RECOGNIZED |
| 21 | | | | | RESET | HALT |

Finally, when the characters have all been picked up and moved to the Columns 30–35 in the manner described and the system has decremented to Column 25 in search of further information to be transported, the MSP at Column 25 will be detected by the MSP detector 188 (FIG. 13). At this time, gate 453' (FIG. 16) will have its inputs Down, $\overline{BS1}$, $\overline{ADV}$, MSP marked, and via path 421 and OR gate 425' sets ADV flip-flop 446 and in such cycle loads Register A with zero, and transfers the zero in Register A to Register B and writes the zero in Register B into core for Column 25. In addition, the Down flip-flop 451 is reset so that the UP input of the counter 154 is marker and in the next cycle (step 19) the gate 418 will have its inputs UP, $\overline{BS1}$, ADV, $\overline{CHAR}$, $\overline{MSP}$ marked and will place logic 1 over OR gate 419' and conductor 424 through OR gate 469 to load zero code into Register A. The system continues cycling to advance the counter over Columns 26–30, zeros being placed into core as the system advances. The zero code is generated by the gate 469 (FIG. 16) and first loaded into Register A, then transferred into the Data Register B for storage over the successive columns.

As the system advances to Column 29, it will be apparent that during pulse CLK 5 of such cycle, the character detector 456 will recognize the presence of the $ character and gate 418 will be disabled since logic 0 now appears on the CHAR inputs thereto.

With gate 418 disabled by reason of the detection of a character the gate 469 is disabled and the upward movement of the counter continues in search of an MSP. As the system advances to column 36 the MSP "4" is detected by MSP detector 188 and such signal via conductor 488 along with signals UP, $\overline{BS1}$, ADV, enables gate 420 which via conductor 470 and OR gate 471 resets LOF flip-flop 443 to terminate the LOF operation. The same logic 1 output signal over OR gates 435, 439, 420' resets flip-flops 451, 445 and 446.

FIELD BACKSPACE

A further novel arrangement in the system comprises a Field Backspace key (FBS) which when operated will backspace to the start of a field. In effecting such mode of operation, as the ER key and the FBS keys on keyboard 12 are depressed, the system will decrement to the MSP of the field. Such operation is, of course, of advantage in effecting the correction of blocks of data of length, since rather than backspace by operating the memory backspace MBS key for each decremental step, the operator need merely press the ER key and the FBS key to return the system to the beginning of the field.

More specifically, with depression of the keys ER and FBS (FIG. 9) of the special function key group 16 on keyboard 12, gate 330 is enabled to trigger strobe generator 330a and thereby set the FBS flip-flop 331 which provides logic 1 over conductor 332, 286 and OR gate 231 to initiate a repeat machine cycle by the machine cycle pulse generator MCP which operates to provide the output pulses X, 1–6, Y in the manner heretofore described.

The logic 1 output from FBS flip-flop 331 (FIG. 9) is also provided over path 333 to an OR gate 334 (FIG. 11) and inverter 335 to one input for gate 310. The output of OR gate 334' is also fed over inverter 337 to one input for gate 311.

In the cycle initiated by reason of the operation of the FBS flip-flop 331, pulse CLK 2 as applied to gate 310 will not be effective to clear the data register B267 as in previous cycles since the output of inverter 335 is effective to inhibit gate 310. As a result the information remains in Data Register B 267 (i.e., will not be cleared). The same pulse over OR gate 334' (FIG. 11) and inverter 337 acts as an inhibit for gate 311 to prevent pulse CLK 3 from transferring the information from Data Register A 260 over gate 263, 265 and path 266 to Data Register B 267, as in the previous cycles, of the pulse generator MCP. Thus the data and program information will be cycled through the B register 267 as in the previous cycles but without purpose as in the other operational modes.

Flip-flop 331 (FIG. 9) was also effective as operated at the start of the action to provide a logic 1 signal over path 334 to the down input for the memory counter 154 (FIG. 12). As the cycle advances to pulse CLK 4, such pulse input to AND gate 152 will cause memory counter 154 to decrement one step, and address decoder 155 will select the next lower position in the memory 50. Assuming, for example, that the system was at Column 13 at the time the field backspace key FBS was operated, the memory counter at this time will step down to Column 12 of memory. Pulse CLK 4 input over gate 268 to Data Register B 267 clears the Data Register B (the information in Data Register B having been read back into the cores by pulse CLK 3 as earlier described).

As the cycle continues, pulse CLK 5 to read gate 166 (FIG. 11) effects readout of the information in column 12 over path 277, gate 264 and 265 and paths 266 to Data Register B (267), and also effects readout of the information in the cores assigned to Column 12 for Program 1 over path 122, gate 143, 145 and path 126 to Program Register B1. The information as provided in Program Register B1 is used by the system to determine whether Column 12 contains an MSP (and therefore the backspacing should be stopped). If no MSP is located, the system continues in its decrement operation in its search for an MSP position.

In the present example, column 12 is seen to include a space, and accordingly such information as placed in Program Register B1 and output over path Q1 and gate 162a, 163, path 164 and 164a, (and also 166) being a space will not result in a change in signal output of the program decoder 165 or MSP detector 188. As a result, the FBS flip-flop 331 will remain set.

As pulse CLK 6 of the cycle occurs, such pulse via write gate 148 will write the information in the data B register 267 back over path 276 into column 12 of the data section in memory 50, and will also effect writing of the information in Program Register B1 over Q path 150 to the cores assigned to column 12 and Program 1 of memory 50.

It will be apparent that since the system did not detect an MSP, the FBS flip-flop 331 will remain set, and the logic 1 output on conductor 332 will maintain a start signal through gate 231 to the machine cycle pulse generator MCP which responsively initiates a further cycle and effects decrementing of the system to Column 11. Since Column 11 likewise contains a space, the system will proceed through the cycle in the manner described above and as pulse CLK 4 of such cycle is generated, the system will be decremented to Column 10. During pulse CLK 5 of such cycle, the information (digit 2 in the present example) in the cores assigned to Column 10 in Program 1 section of memory 50 will be read into Program Register B1 over the path described above. With digit 2 in Program Register B1 and output over path Q1 and gates 162a, 163 and path 164b, 166 to gate 188 will enable one input to MSP gate 193 (FIG. 13).

As the pulse CLK Y in such cycle is generated, gate 193 is enabled and via path 193a and gate 340 provides logic 1 to the reset input of FBS flip-flop 331 (FIG. 9) to reset such flip-flop. As flip-flop 331 resets, a logic 0 signal is provided on conductor 332 and 286 to the start conductor for the machine cycle pulse generator MCP and no further cycling is effected. It will be apparent that the system has now been brought to rest at Column 10 which contains the MSP for the Clock field (FIG. 4) and that such operation has been automatically effected by simultaneous operation of the ER and FBS keys on keyboard 12.

RELEASE TO TAPE

With the system in the data entry mode, and advancement of the system to the end of the record (column 80 in the present example) an output signal from the display matrix section 26 over conductor 256' to counter 154 restores the counter to position 1, and over conductor 256, gate 356 and path 256a results in a release strobe signal to the tape control logic 290 to begin forward tape motion. A write clock signal output from the tape control logic over conductor 350 and via gate 231 and FF112, starts the machine cycle pulse generator MCP repetitively until such time as the data is transferred, character by character, from each of the 80 columns in memory 50 to the tape recorder. After a complete record has been written on tape, a read after write check is performed to compare each character which has been recorded on tape with the characters which have restored to memory during the tape recording cycle.

More specifically, as the counter 154 returns the system to Column 1 of memory and the machine cycle pulse generator MCP (FIG. 10) operates as a result of the input signal placed on start conductor 350 by the tape control logic (FIG. 13), pulse CLK X over gate 265 (FIG. 11) to Data Register B (267) results in clearing of the data from Data Register B and the same pulse CLK X to read gate 166 results in reading of the data information stored in Column 1 over path 277, gates 264 and 265 and path 266 for storage in Data Register B.

At pulse CLK 3, with gate 330 enabled by a signal on path 352 from tape logic, the data in Data Register B which appears on the six-conductor path $\bar{Q}$ output is clocked over gate 330 (FIG. 13) to the recording head (not shown) for the tape deck TD, for recording thereon. The pulse CLK 3 over delay gate 146' (FIG. 11) and write gate 148 effects writing of the information in Data Register B back into the cores assigned to data storage for column 1, such transfer being effected from the $\bar{Q}$ output of Data Register B over conductor 276 to the data cores for Column 1 in memory 50. In summary, a read-restore operation in the initial part of each cycle transfers the information stored in the data cores for the selected column in memory to Register B for transfer to the recording head, and thereafter the same information on Register B is restored to the selected column.

As the pulse CLK 4 of the same cycle is output from the pulse generator MCP to gate 152 (FIG. 12), the memory counter 154 increments to the second position in memory 50. Pulse CLK 5, 6, Y are without significant effect in the present system. As the next cycle occurs, initiated by write clock pulse over conductor 350 and gate 231, the information which appears in the data cores for Column 2 of memory is fed over the Data Register B to the tape recording head for recording on tape and then restored to Column 2. The counter is then advanced to the third position in memory. The remaining characters in memory are written on tape in a similar manner until such time as column 80 is reached, and a signal indicating such position in tape control logic 296 results in reset of tape control logic 290 to terminate the tape movement.

The tape control logic 290 now effects a read after write operation. That is, the tape control logic 290 in its initial operation effects movement of the tape in a forward direction to record the data which is stored in memory 50 in the manner described, and upon completion of the readout of the information from the memory to tape, stops, moves backward over the record, stops, and moves forward again and stops. This forward, backward, forward motion is used to provide a security check of the information which has been transferred to tape. That is, it will be recalled that in the first forward movement described above the record was written from the data memory 50 to tape without destroying the data in memory. As the tape is now backspaced, the tape is positioned so that during the second forward motion the machine cycle pulse generator MCP actuated by tape read clock pulses via conductor 351 cycles the system to cause the data just written on tape to be fed via path 314 and gate 246 to the Data Register A (260). Simultaneously the information in memory is fed via Data Register B (267) and $\bar{Q}$ output over conductor 269' to comparator 270. In the event of a noncompare, a signal output over conductor 272 indicates a tape error. Tape movement is terminated when there is no more data read from the data block recorded on tape.

If the data transfer is successful, a ready light on the display panel will signal that the data station is ready for the next record entry, and that the data on tape is the same as the data entered into memory via the keyboard. The details of the tape control logic 290 and the operation of the circuitry in response thereto, while an important feature of the data station, are not pertinent to the inventive concepts claimed in the present disclosure, and accordingly are not set forth in detail hereat.

After the successful transfer of data to tape, the tape control logic 290 automatically generates the ER/HOM signal and causes the system to return to Column 1 of memory so that a further record entry may be made.

We claim:

1. In a key to tape data processing apparatus comprising a manually operable keyboard, memory means for temporarily storing alphanumeric data to be recorded on the magnetic tape of associated tape means, coding means for converting the alphanumeric data introduced by operation of the keyboard to a form for storage in said memory means, cycling means, means controlled by said cycling means for transmitting the signals output from said coding means to said memory means, and display means having a first display readout for providing a display of the data stored in the memory in a direct alphanumeric presentation to the operator, and a second display readout for providing a numeric display which identifies the position in memory in which the alphanumeric being displayed by the first display readout is stored.

2. A key to tape data processing apparatus as set forth in claim 1 in which said first display readout includes alphanumeric characters arranged in a pattern which is identical to the location of corresponding alphanumeric characters on said keyboard, and which includes means for enabling selective readout of each alphanumeric character on said display means independently of the other characters thereon.

3. In a key to tape data processing apparatus, a manually operable keyboard, memory means for temporarily storing alphanumeric data to be recorded on the magnetic tape of associated tape means including a plurality of discrete information storage positions, and addressing means for selectively addressing different ones of said positions, coding means for converting the alphanumeric data introduced by operation of the keyboard to a form for storage in said memory means, cycling means, means controlled by said cycling means for transmitting the signals output from said coding means to said memory means, and display means having a first display readout for providing a display of the data stored in the memory in a direct alphanumeric presentation to the operator and a second display readout comprising a set of numbers arranged in a horizontal row, each of which is preassigned to represent a different position in memory, and position matrix means for enabling each number independently of the other to provide a numeric readout of the selected position in memory at all times along with the readout on said first display means of the alphanumeric characters stored in the selected position in memory.

4. A key to tape data processing apparatus as set forth in claim 3 in which different segments of said alphanumeric data are entered into different fields in said memory means, each of which fields comprises one or more of said positions in memory, and in which said display means includes a third readout comprised of alphanumeric indicia for selectively displaying to the operator identification data for each of said fields.

5. A key to tape data processing apparatus as set forth in claim 3 which includes enabling means for selectively and independently enabling said alphanumeric characters on said first display readout, and means enabled by said cycling means for selectively and simultaneously gating information from said memory means to said enabling means and to said tape means.

6. In a key to tape data processing apparatus comprising a manually operable keyboard, memory means for temporarily storing alphanumeric data to be recorded on magnetic tape, coding means for converting alphanumeric data introduced by operation of the keyboard to a form for storage in said memory means, cycling means, display means having alphanumeric character means for providing an alphanumeric readout of data stored in said memory means, each of said different character means having a fixed preassigned position on said display means and a discrete illuminating source, decoding means for selectively enabling the illuminating source for the alphanumeric character on said display means, data register means, first gate means controlled by said cycling means to selectively enable transfer of the information in said data register means to said memory means, output means for connecting the output of said data register means to said memory means and also to said decoding means to effect display of only the alphanumeric character which is registered therein, and backspace key means for effecting transfer of the character last stored in the memory means to said data register means for display in its fixed position by its discrete illuminating source.

7. In a key to tape data processing apparatus, a manually operable keyboard, memory means for temporarily storing alphanumeric data to be recorded on magnetic tape, coding means for converting alphanumeric data introduced by operation of the keyboard to a form for storage in said memory means, cycling means, display means having alphanumeric character means for providing an alphanumeric readout of data stored in said memory means, decoding means for selectively enabling the alphanumeric characters on said display means, data register means, first gate means controlled by said cycling means to selectively transfer information in said memory means to said data register means, and output means connecting the output of said data register means to said decoding means to effect display of information stored therein, comprising at least six conductors B A 8 4 2 1 for providing an indication in binary code of the data fed to said data register means said display means including a matrix comprised of at least four horizontal conductors and 16 vertical conductors, a lamp and a unidirectional device connected between the horizontal and vertical conductor, and a first decoder means having its inputs connected to two of said six conductors, and the outputs thereof connected to said four horizontal conductors, and a second decoder means having a first section having its input connected to conductors 8 4 2 1, at least, of said six conductors, and a second section having its inputs connected to conductors 8̄ 4 2 1, at least, of said six conductors, and means connecting the outputs of said first and second sections respectively to different ones of said 16 vertical conductors.

8. A key to tape data processing apparatus as set forth in claim 6 which includes other register means connected to said coding means for receiving the signal output therefrom and other gate means controlled by said cycling means to transfer the coded data as stored in said other register means to said first register means, and in which said first gating means are controlled thereafter by cycling means in the same cycle to transfer the coded information in said first data register means to said memory means.

9. In a key to tape data processing apparatus comprising a manually operable keyboard, memory means for temporarily storing alphanumeric data to be recorded on magnetic tape, coding means for converting alphanumeric data introduced by operation of the keyboard to a form for storage in said memory means, said memory means having a field of positions, each position having means for storing data received from said coding means, cycling means, display means having alphanumeric character-display means for providing an alphanumeric readout of data stored in each position in said memory means, and program identification means for identifying the program for each field, means controlled by said cycling means for selectively enabling the alphanumeric characters on said display means to present the information in a selected position in said memory means, and program means controlled by said cycling means for simultaneously providing a presentation on said program identification means of the identification character for the field in which said characters are stored.

10. In a key to tape data processing apparatus as set forth in claim 9 in which said program identification means includes digit identification means for each different field and alpha identification of each different field.

11. A key to tape data processing apparatus as set forth in claim 9 which includes selection means for placing the system in the verification mode, and said program means includes MSP detector means for detecting the identification character for a field responsive to advancement of the system to the most significant position for such field, and verification means enabled by said MSP detector means to provide automatic verification signals for each of the remaining positions in such field.

12. In a key to tape data processing apparatus comprising a manually operable keyboard, memory means having a plurality of discrete positions, each of which is used to temporarily store data to be recorded on a magnetic tape, coding means for providing data introduced by operation of the keyboard in a form for storage in said positions in said memory means, cycling means operative to provide a sequence of enabling pulses in a cyclic pattern, first means including a first register, first gating means controlled by said cycling means in a given cycle to transfer the coded information from said coding means to said first register, second register means, second gating means controlled by said cycling means in the same cycle to transfer the coded data as stored in said first register means to said second register means, display means including decoder means for providing a visual display to the operator of the alphanumeric information in said second register means, means controlled by said cycling means in the same cycle to transfer the coded information from said second register means to said memory means for storage thereon, and position selection means controlled by said cycling means in the same cycle to select the next position in said memory means.

13. A key to tape data processing system as set forth in claim 12 in which each of which positions in said memory means has storage means, certain of said storage means for each position being connected to store the data information input from said second register means, and others of which are connected to store program information.

14. A key to tape data processor system as set forth in claim 13 in which said coding means are operative to provide coded program signals responsive to operation of said keyboard, and means including a program register controlled by said cycling means to enter the program signals into the others of said storage means for said positions.

15. A key to tape data processing system as set forth in claim 14 which includes means controlled by said cycling means for reading the data information in said storage means for a position into said second register means and simultaneously reading the program information in said storage means for the same position into said program register means.

16. A key to tape data processing system as set forth in claim 15 which includes means connected to said program register means for determining the program for the succeeding cycle of said cycling means.

17. A key to tape data processing system as set forth in claim 15 which includes means for detecting the identifying character for a field of positions as placed in said program register means during a cycle.

18. A key to tape data processing system as set forth in claim 17 which includes means for providing automatic generation of characters for use in verification of the positions following the most significant position of a field having a given identifying character in said program register.

19. A key to tape data processing system as set forth in claim 17 which includes means for effecting cycling of the positions of a field in a data duplicating operation responsive to detection of a predetermined digit in said program register.

20. A key to tape data processing system as set forth in claim 12 which includes switch means for selecting a data entry operating mode, and alternately a program entry mode for the system, and in which said first and second registers are used to provide data information to said memory means for storage, and which includes a third and a fourth register corresponding to said first and second registers for processing program data from said coding means to said memory means, and means controlled by said cycling means to simultaneously effect a read and restore operation for said second and fourth registers.

21. A key to tape data processing system as set forth in claim 12 which includes switch means for selecting a data verify mode, and which includes means controlled by said cycling means for reading information from said memory means to said second register, comparator means, and means connecting the output of said first register means and said second register means to said comparator means for data verification purposes.

22. A key to tape data processing apparatus as set forth in claim 12 in which operation of a key on said keyboard initiates operation of said cycling means to provided said sequence of pulses, and which includes reset means for clearing said first register responsive to one of said pulses and prior to operation of said first gating means to transfer the data from said coding means to said first register, clearing means for clearing said second register in response to a further one of said pulses, and read means for thereafter reading the data from a position in memc.y into said second register to clear such information from memory, said first gating means being operated thereafter by a further pulse from said cycling means to transfer the data in the first register to said second register, and write means controlled thereafter to write the information in the second register into the same position in said memory means.

23. A system as set forth in claim 22 which includes address means responsive to a subsequent one of said pulses in the same cycle to effect selection of a different position in said memory means.

24. A system as set forth in claim 22 which includes inhibit means for inhibiting said clearing means in duplication cycles.

25. In a key to tape data processing apparatus comprising a manually operable keyboard, memory means including a first plurality of positions for temporarily storing data to be recorded on magnetic tape, and a second plurality of positions for storing program information, certain of which are arranged in fields, each field having an identification character located in one of its positions, coding means for converting data introduced by operation of the keyboard to a form for storage in said memory means, cycling means, switch means for selecting an entry and verification mode for the data provided by said coding means, register means, means controlled by said cycling means for transferring the coded data from said coding means to said register means with said switch means in said entry mode, and automatic program verification means operative with said switching means in said verification mode to automatically provide coded program information to said register means including means for checking the program position for each field identification character, and generator means responsive to detection of a field identification digit for a field to automatically provide verification digits for each digit in said field.

26. A key to tape processing apparatus as set forth in claim 25 in which the positions of each field other than the position which stores the field identification character have spaces or ones stored therein, and in which generator means in said automatic program verification means are operative to provide spaces or ones for verification purposes until the field identification character for a subsequent field is detected.

27. A system as set forth in claim 25 in which said generator means includes means responsive to detection of certain program information to enable said automatic verification means to provide spaces to said register means, and responsive to detection of other program information to provide logic one signals to said register means for verification purposes.

28. In a key to tape data processing apparatus comprising a manually operable keyboard, memory means having a plurality of positions for temporarily storing data to be recorded on magnetic tape, coding means for providing coded signals for each character keyed on said keyboard for storage in said memory means, cycling means, and means including at least one register means controlled by said cycling means for transferring the coded data to said memory means for storage, address means for selecting different ones of said memory positions, left zero fill key means for transferring data entered in the most significant positions of a field of positions to the least significant position in the field comprising means controlled by operation of said key means and said cycling means after entry of data in a left zero field to advance said addressing means to the most significant position of the next field, while clearing old data from each position and leaving such positions devoid of character codes means controlled by detection of said MSP to decrement said addressing means in search of the last entered character in the field, character detection means for detecting presence of a character in a position, and means responsive to such detection to transfer the character in memory in said position into one said register means for temporary storage and to condition said addressing means to increment responsive to further operation of said cycling means, means responsive to detection of the MSP of the next field to step the addressing means down one position and to place the character in said memory into the selected position in memory (MSP-1).

29. A system as set forth in claim 28 in which means control said addressing means to be decremented with further operation of said cycling means and means controlled by said character detection means to effect transfer of the next character detected into said register for transport to position MSP-2.

30. A system as set forth in claim 28 which includes means responsive to detection of the MSP for the field after each of the characters has been transported to the less significant position to increment said addressing means and load zeros into each of the positions in such field which do not have a character.

31. The method of effecting a left zero fill operation in a system in which characters are entered in a field of positions in order starting with the most significant position of the field which comprises the steps of advancing over the remaining positions of such field after entry in search of the most significant positions of the next field, at the same time clearing those positions of old data and character codes, decrementing the search from the MSP as detected to the last character entered in the first field, transferring said last character from its position in memory into temporary storage, readvancing over the positions in search of the MSP of the next field, or a character previously transferred, and after detection of such MSP, or character, stepping back one position and transferring the stored digit into the MSP-1 position, or the character-1 position.

32. In a key to tape data processing apparatus comprising a manually operable keyboard, memory means for temporarily storing data to be recorded on magnetic tape, coding means for converting data introduced by operation of the keyboard to a form for storage in said memory means, said memory means having a plurality of positions, each of which has storage means for storing the coded information for a keyed character, cycling means, addressing means controlled by said cycling means to select different ones of said positions in memory, means controlled by said cycling means for transferring the coded data to the selected position in said memory means, one of said characters identifying a field consisting of a plurality of said positions, said one character being placed in the MSP position for such field, field backspace key means, means responsive to operation of said field backspace key means to control said cycling means to decrement said addressing means in the selection of successive positions in such field, means for detecting an MSP character in a position as selected, and means enabled responsive to selection of such position by said addressing means to terminate further decrementing of said addressing means by said cycling means.

33. In a key to tape data processing apparatus comprising a manually operable keyboard, memory means having a plurality of discrete information storage positions for temporarily storing alphanumeric data to be recorded on magnetic tape, and address means for selectively addressing different ones of said positions, coding means for converting alphanumeric data introduced by operation of the keyboard to a form for storage in said memory means, cycling means, display means having first means for providing an alphanumeric readout of data stored in said memory means, and second means comprising a set of numbers, each of which is assigned to represent a different position in memory, position matrix means for enabling each number independently of the others to provide a numeric readout of the selected position in memory at all times, decoding means for selectively enabling said position matrix means, data register means, first gate means controlled by said cycling means to selectively transfer information in said memory means to said data register means, enabling means for said alphanumeric character means, and output means connecting the output of said data register means to said enabling means to effect the display of the information from a selected position which is stored in the data register means along with the numeric identification of the selected position in memory.

34. A key to tape data processing system as set forth in claim 33 which includes counter means for driving said address means, and record selector means for establishing records of different lengths including means for selecting a position on said position matrix means, and means for coupling the signal output from said position matrix means over said record selector means to inhibit further operation of said counting means with selection of such position.

* * * * *